United States Patent [19]

Beck

[11] Patent Number: 4,607,716

[45] Date of Patent: Aug. 26, 1986

[54] AGRICULTURAL APPARATUS WITH AN AUTOMATIC POSITIONING MECHANISM AND METHOD

[76] Inventor: Charles L. Beck, 238 Naples St., Chula Visa, Calif. 92011

[21] Appl. No.: 542,116

[22] Filed: Oct. 14, 1983

[51] Int. Cl.$^4$ ............................................. B62D 5/06
[52] U.S. Cl. ................................. 180/131; 104/244.1; 172/283
[58] Field of Search ............... 180/131, 79; 104/244.1; 280/776; 172/278, 283, 580, 591; 15/10.2, DIG. 15

[56] References Cited

U.S. PATENT DOCUMENTS

| | | | |
|---|---|---|---|
| 1,248,599 | 12/1917 | Bartholomew | 104/244.1 |
| 1,868,360 | 7/1932 | Knight | 104/244.1 X |
| 1,952,496 | 3/1934 | Graham | 104/244.1 |
| 2,993,548 | 7/1961 | Kiel | 180/131 X |
| 3,797,602 | 3/1974 | Sumida | 180/131 |
| 3,946,825 | 3/1976 | Gail | 180/131 |
| 4,161,143 | 7/1979 | Passe et al. | 104/244.1 |

Primary Examiner—John A. Pekar
Attorney, Agent, or Firm—Knobbe, Martens, Olson & Bear

[57] ABSTRACT

Automatic steering mechanism for use on apparatus for forming raised beds or ridges and furrows and lowered beds with uniform spacing with the apparatus being of a type comprising a self-propelled vehicle having a steering apparatus for steering the vehicle and a ground engaging implement carried by the vehicle for forming a guiding surface, such as provided by a ridge or furrow in the ground along the path of travel of the vehicle as the vehicle moves. The steering mechanism comprises a framework adapted to be secured to the vehicle. In one form, it also comprises a boom structure mounted on the framework for pivotal movement about a horizontal axis extending longitudinally of the vehicle; and an arm, pivotally mounted on the outer extremity of the boom structure for pivotal movement. A follower carried by the arm follows the guide surface formed in the ground. An electrical circuit is provided responsive to movement of said arm from its generally vertical position to control the movement of a steering assembly whereby movement of said arm causes operation of the steering assembly to automatically steer the vehicle in accordance with the movement of the follower.

In another arrangement, the follower and arm are arranged so that the follower always trails its connection to the frame.

19 Claims, 47 Drawing Figures

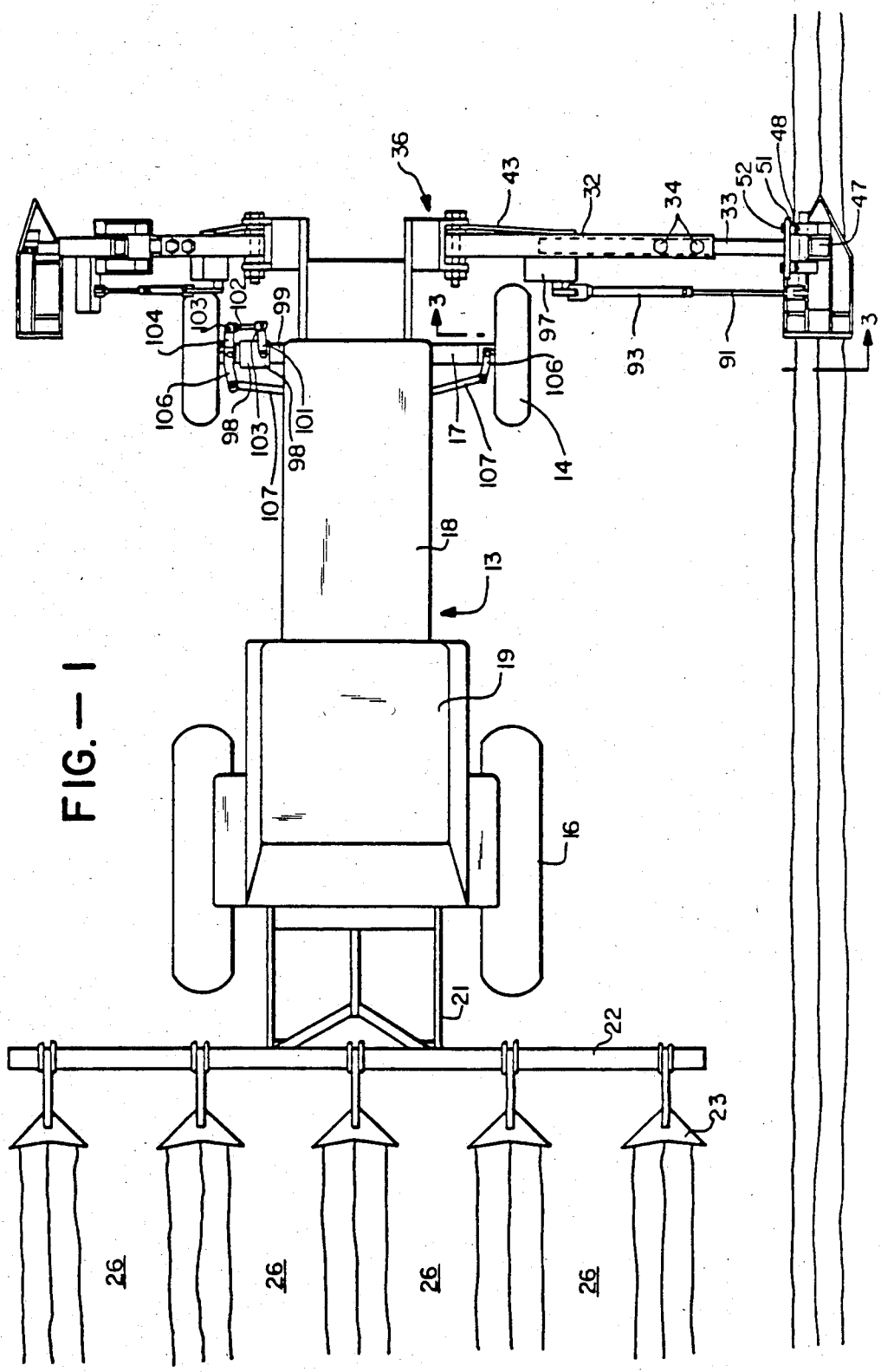

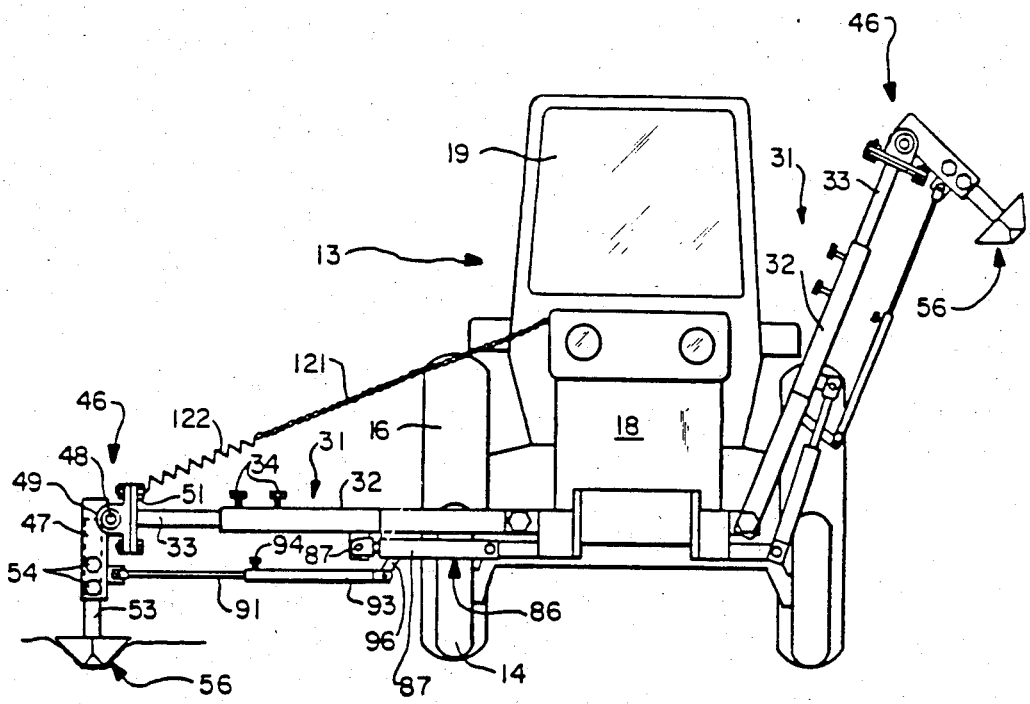
FIG.—2
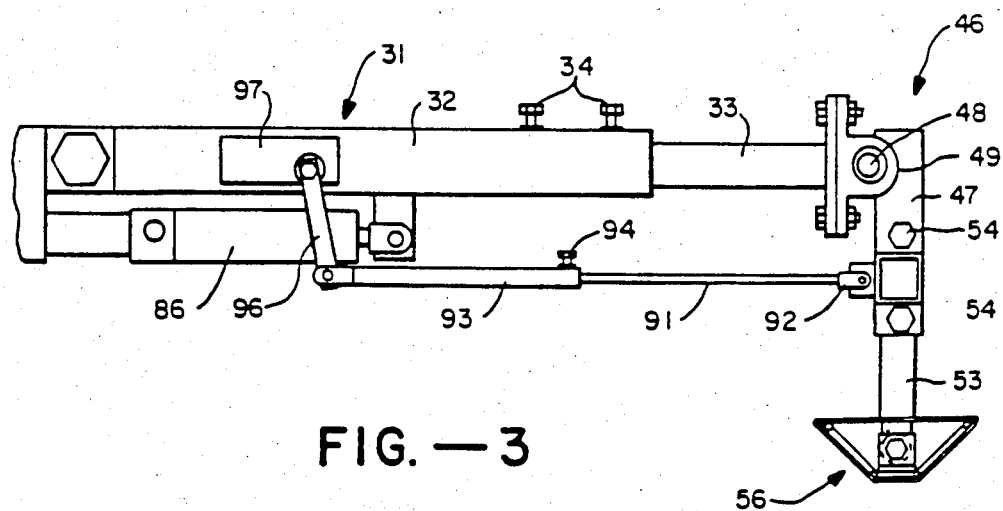
FIG.—3

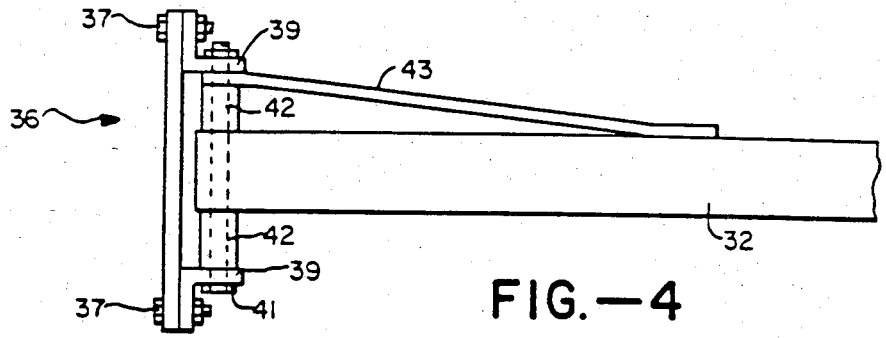
FIG.—4
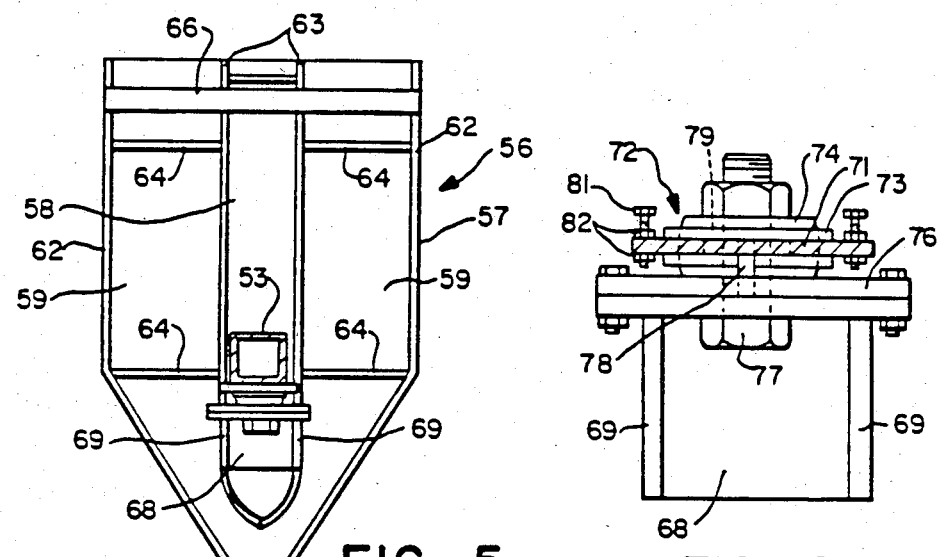
FIG.—5  FIG.—6
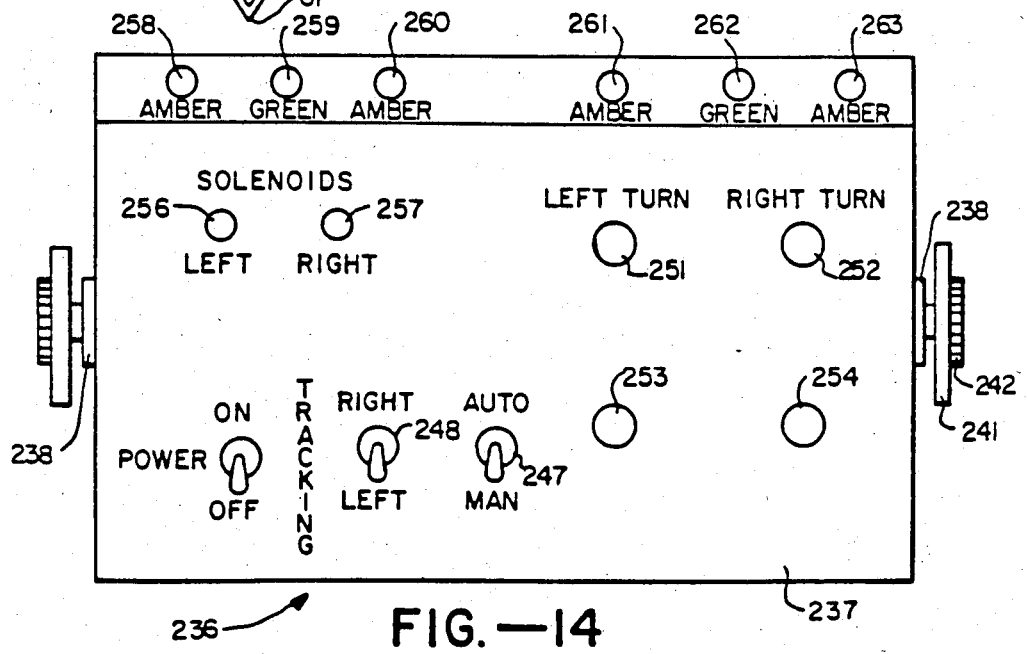
FIG.—14

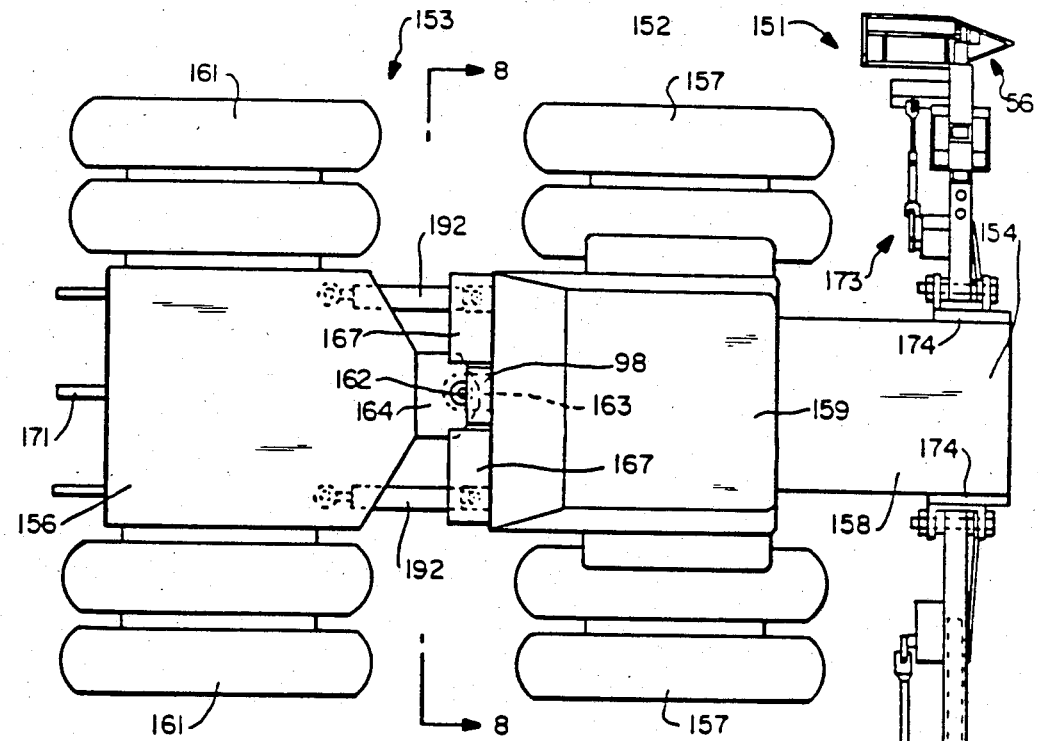
FIG.—7
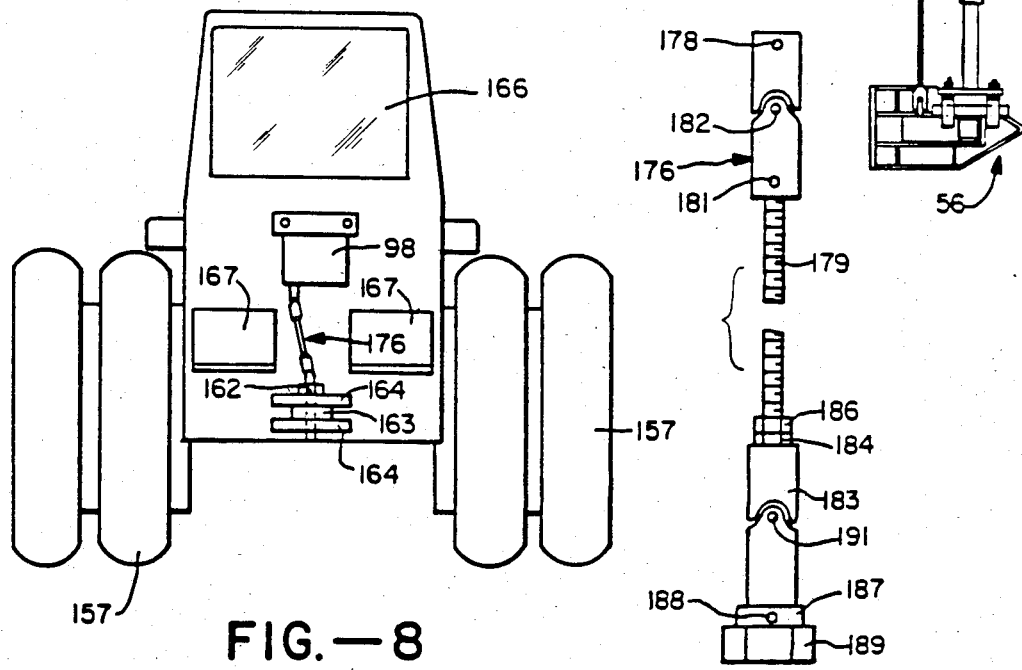
FIG.—8
FIG.—9

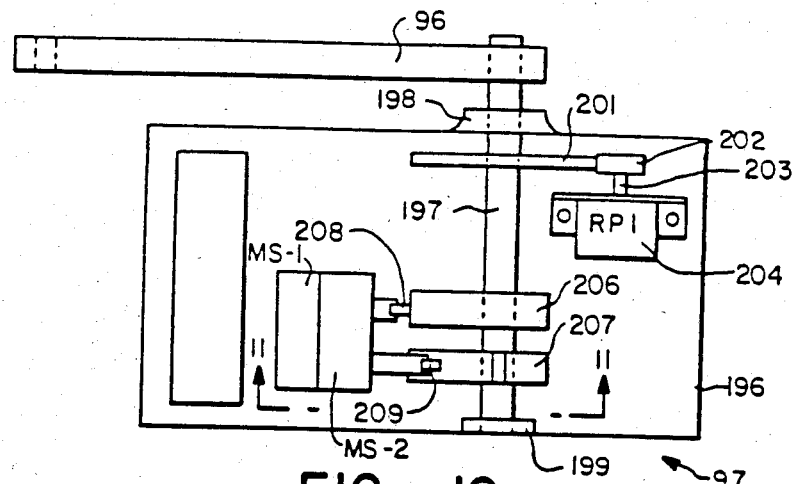
FIG.—10
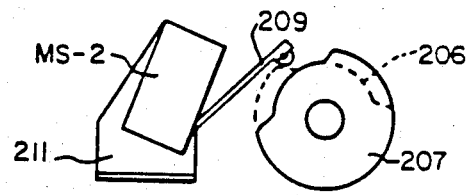
FIG.—11
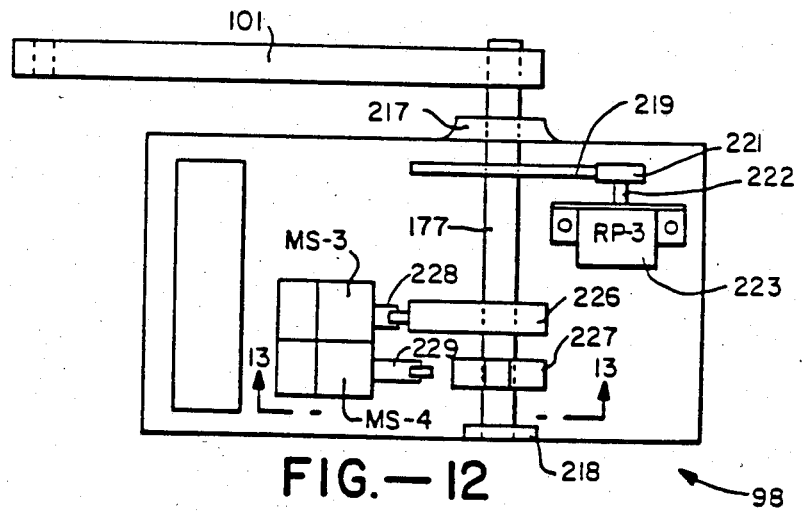
FIG.—12
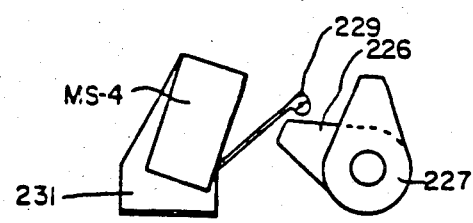
FIG.—13

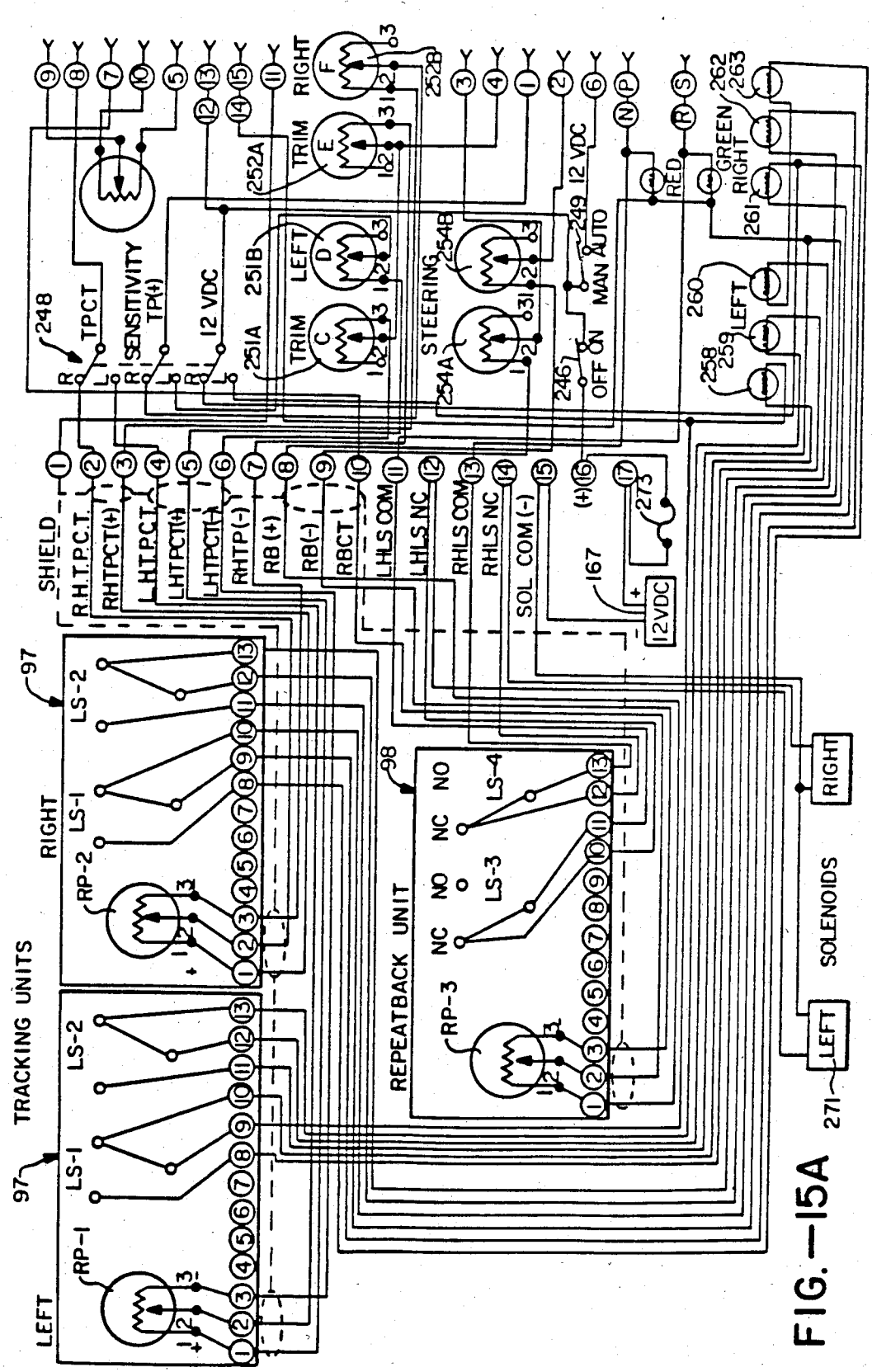
FIG.—15A

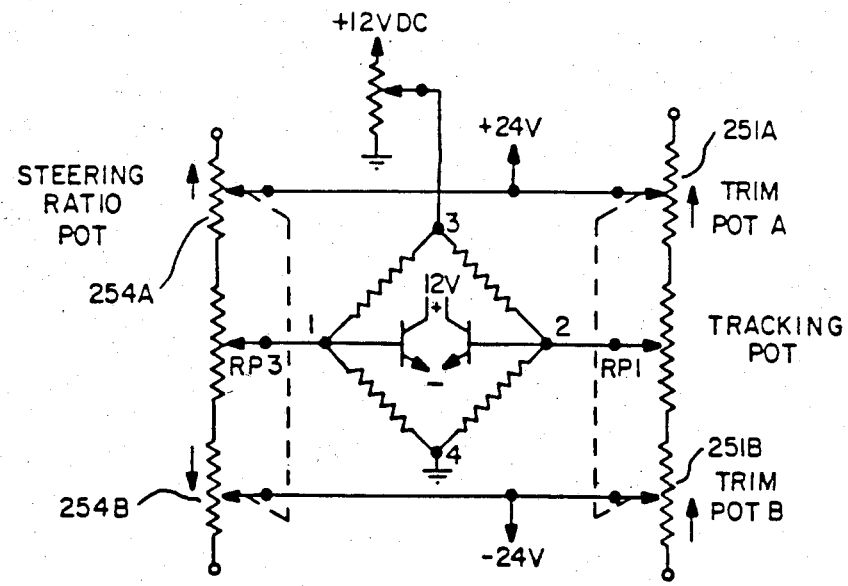
FIG.—16
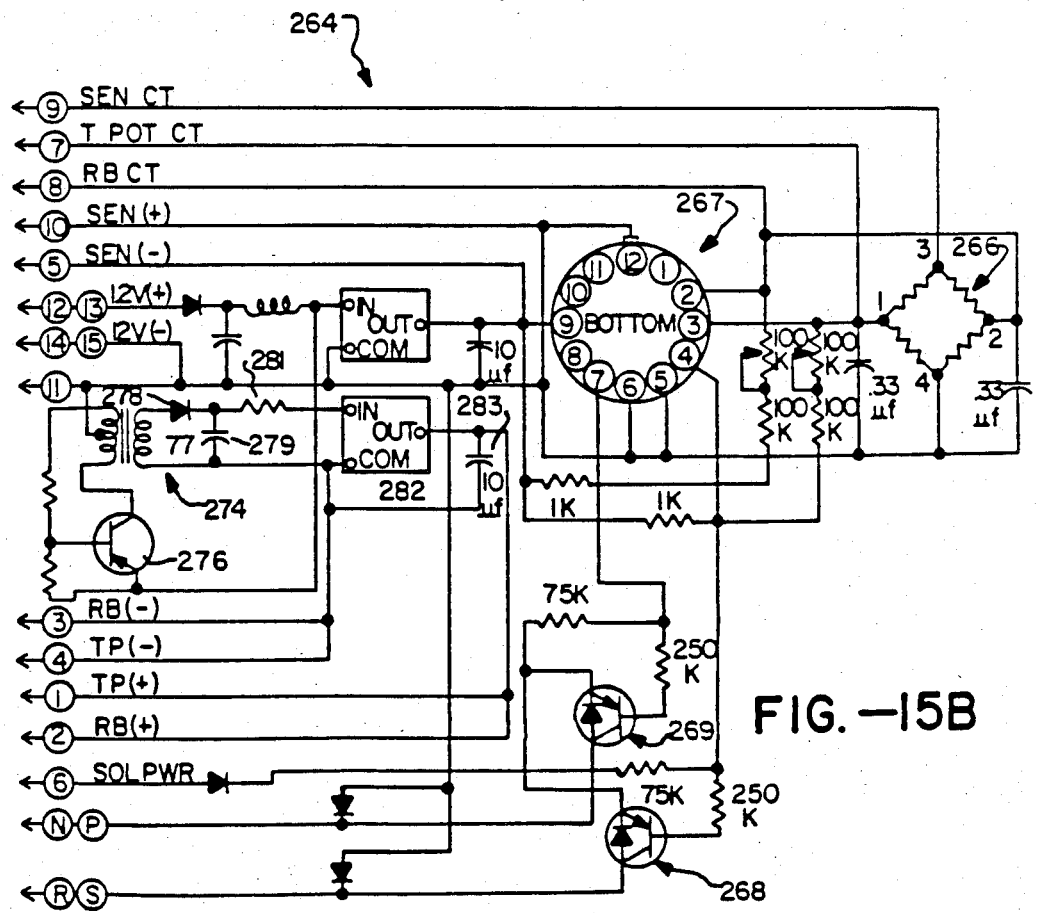
FIG.—15B

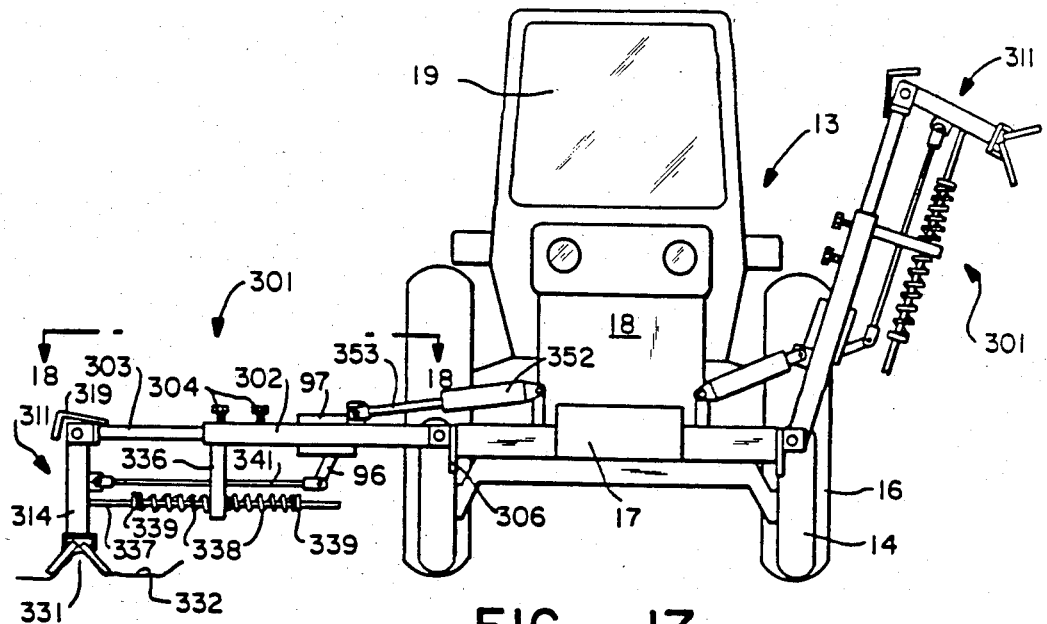
FIG.—17
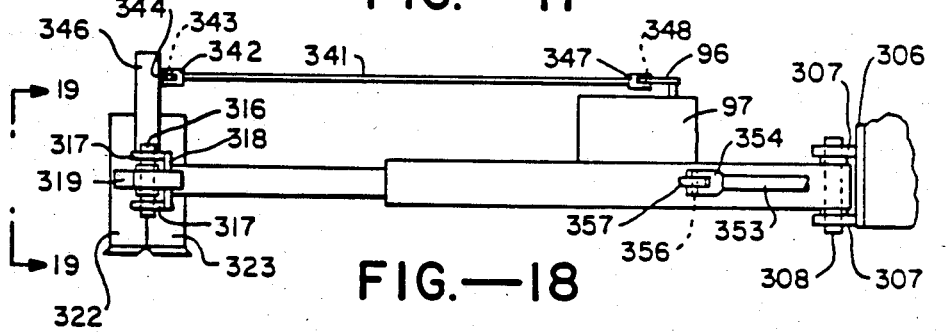
FIG.—18
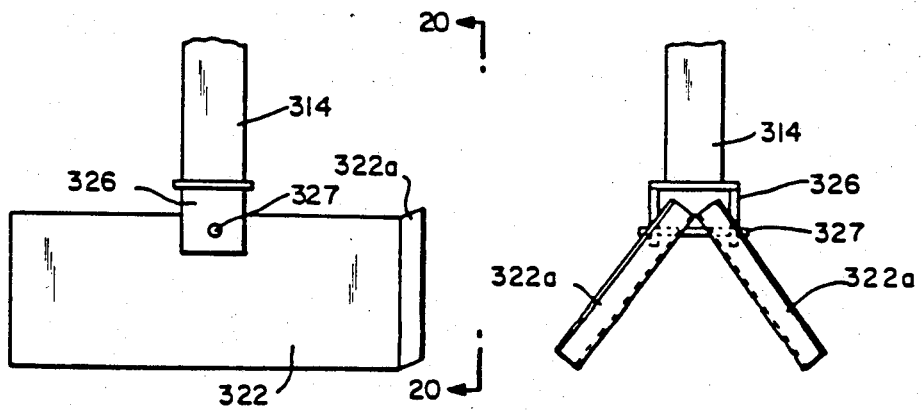
FIG.—19    FIG.—20

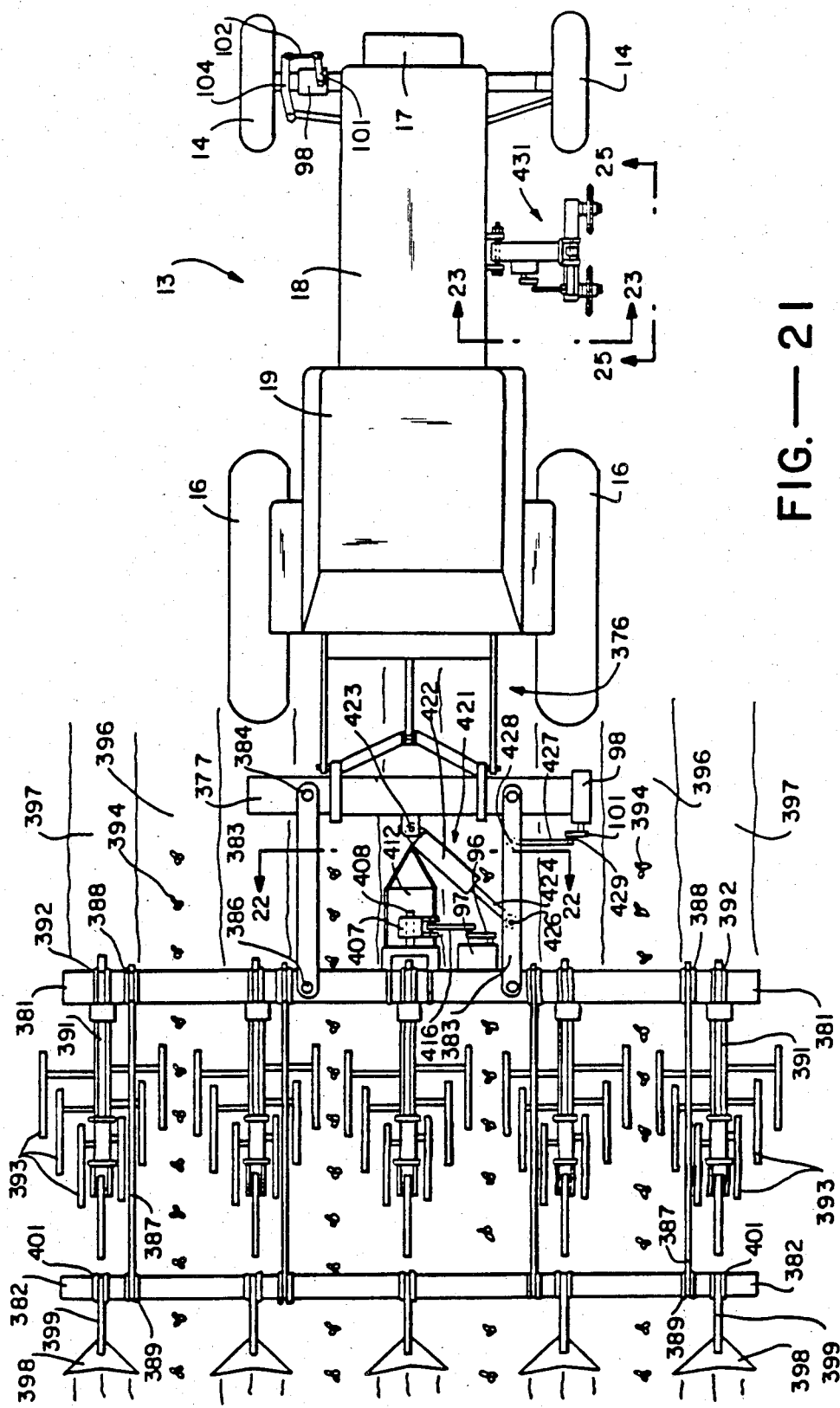
FIG.—21

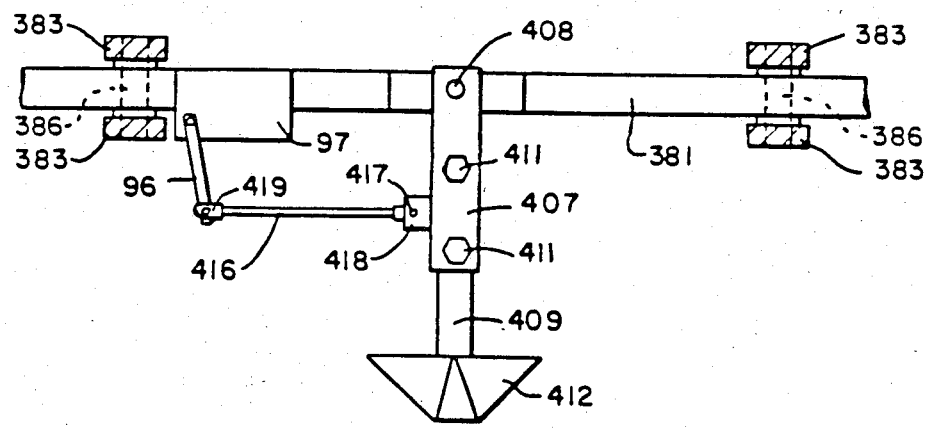
FIG.—22
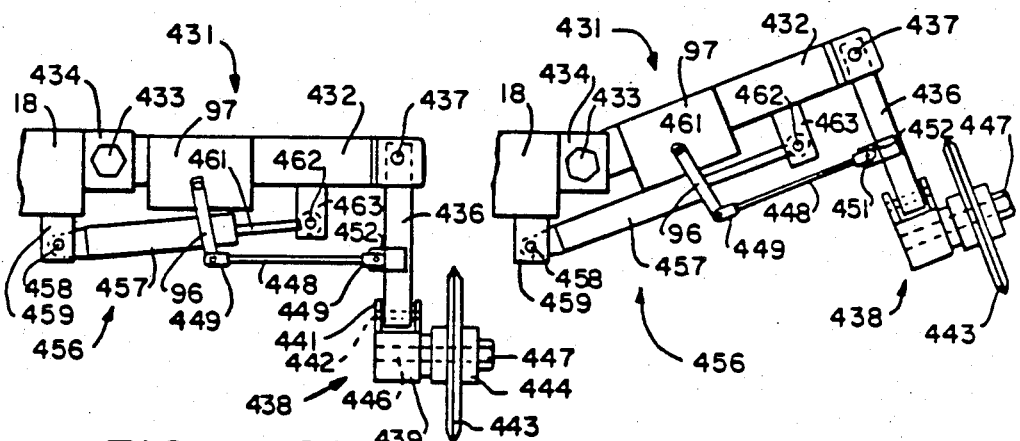
FIG.—23   FIG.—24
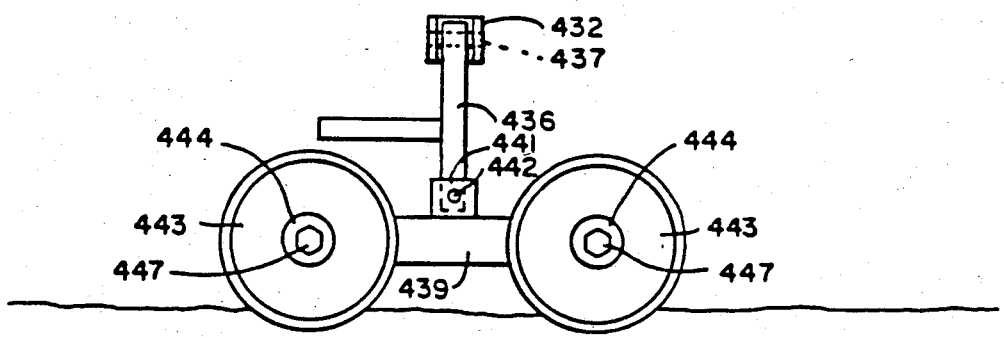
FIG.—25

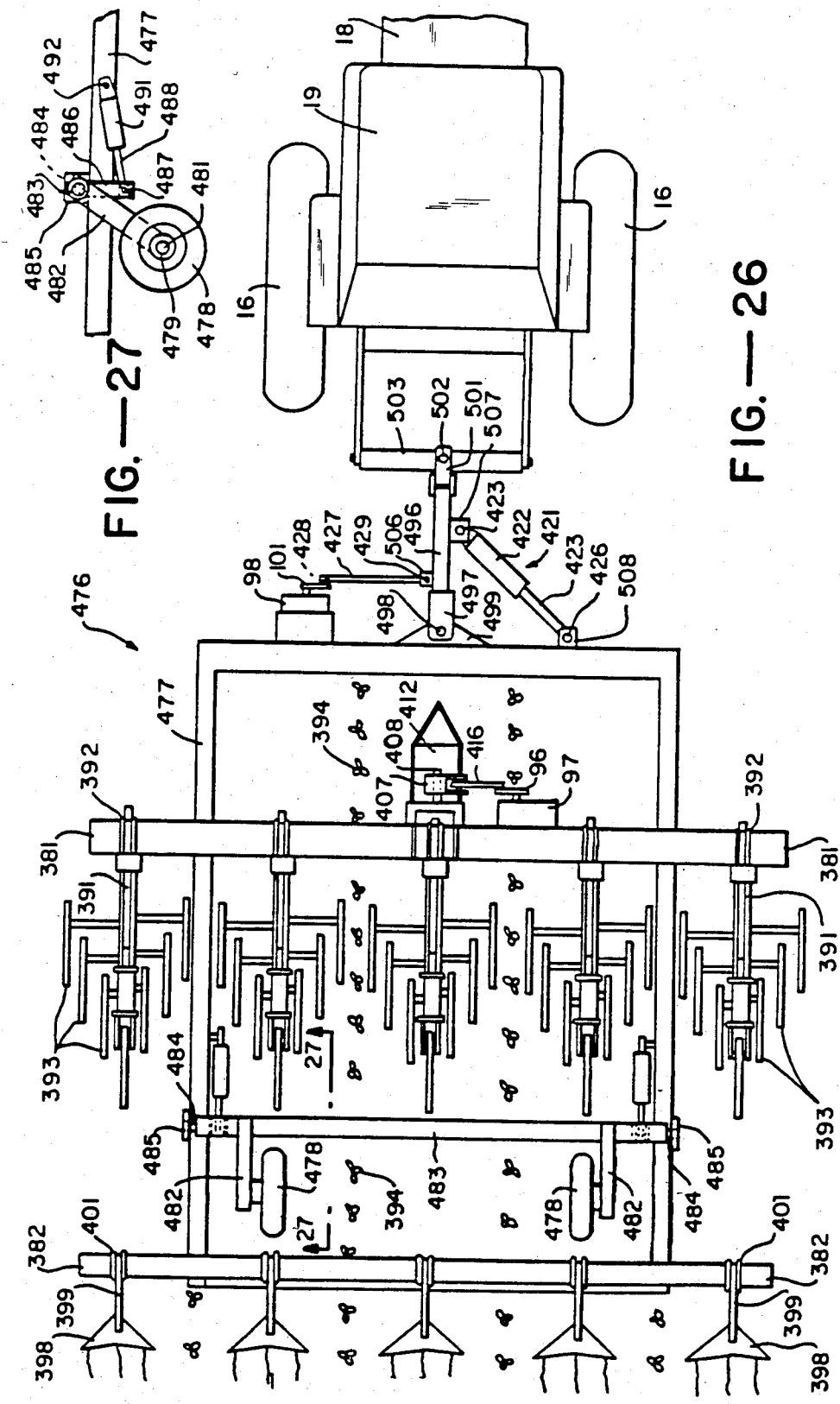

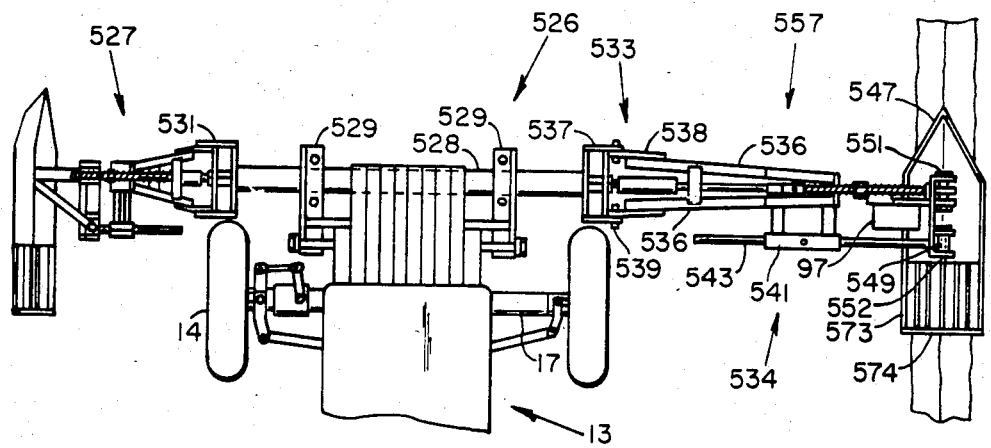
FIG.—28
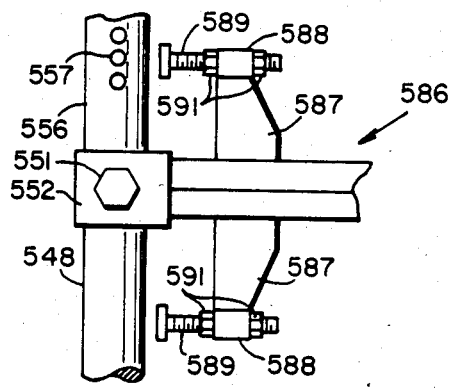
FIG.—29A
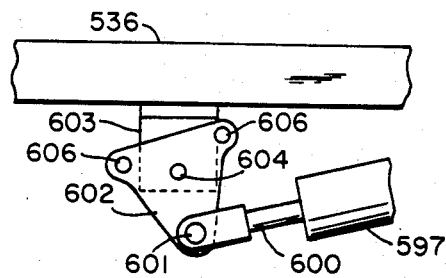
FIG.—29B

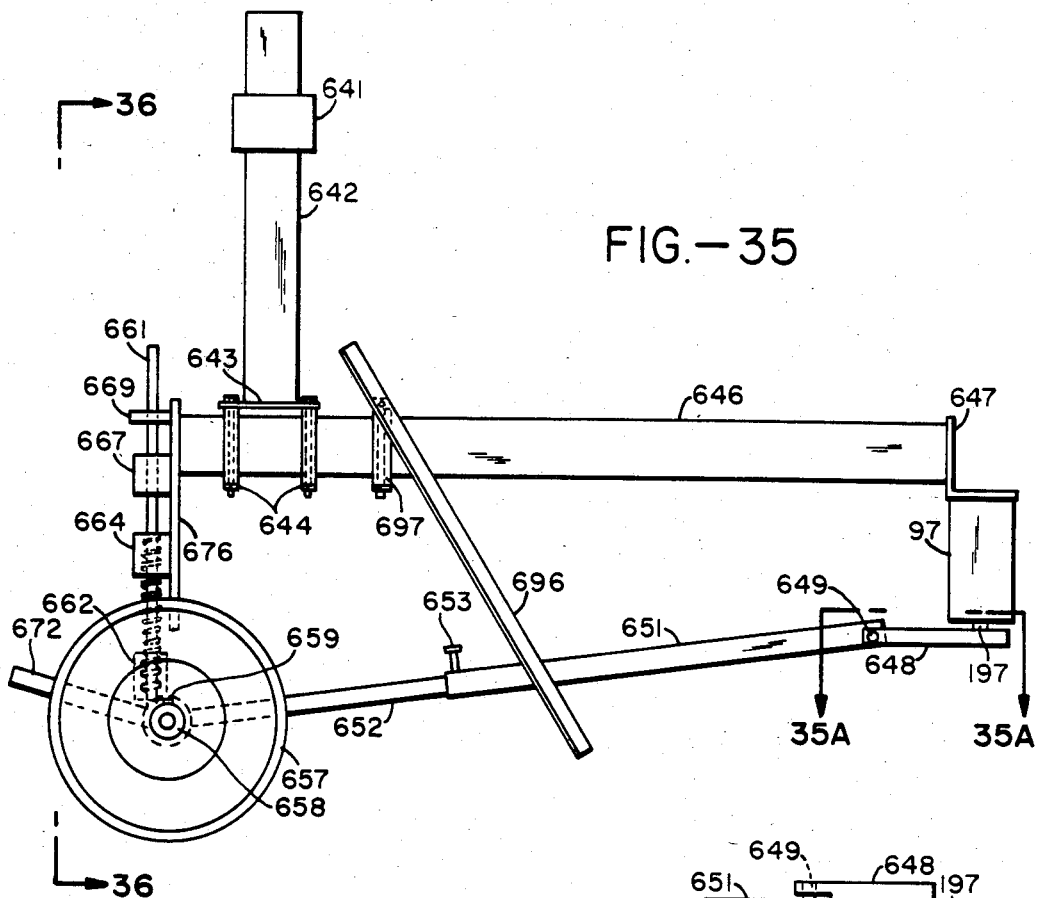
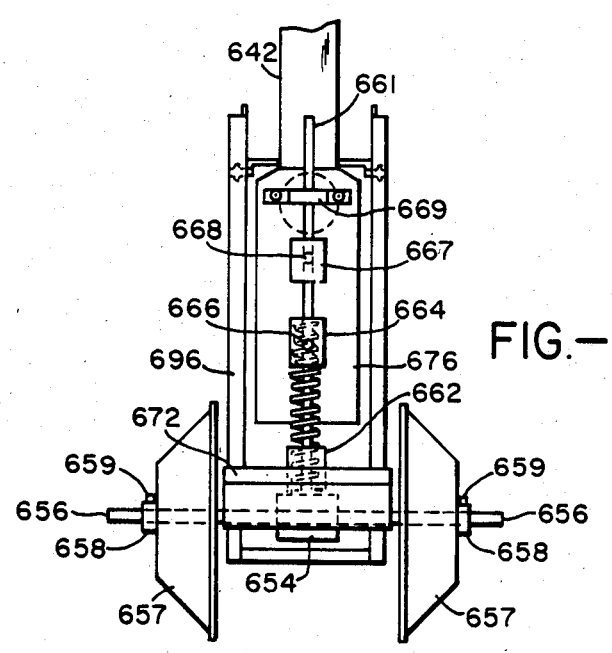

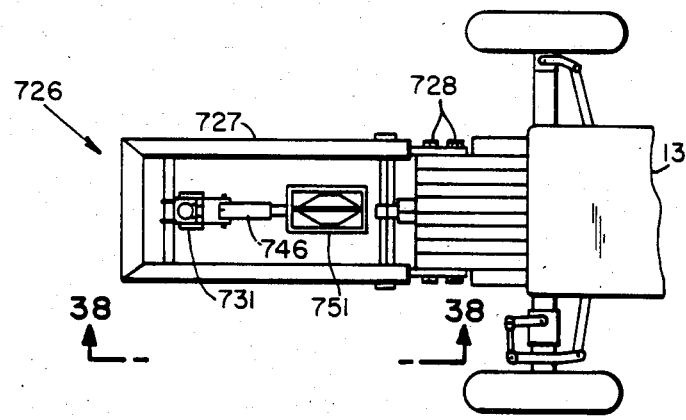
FIG.—37
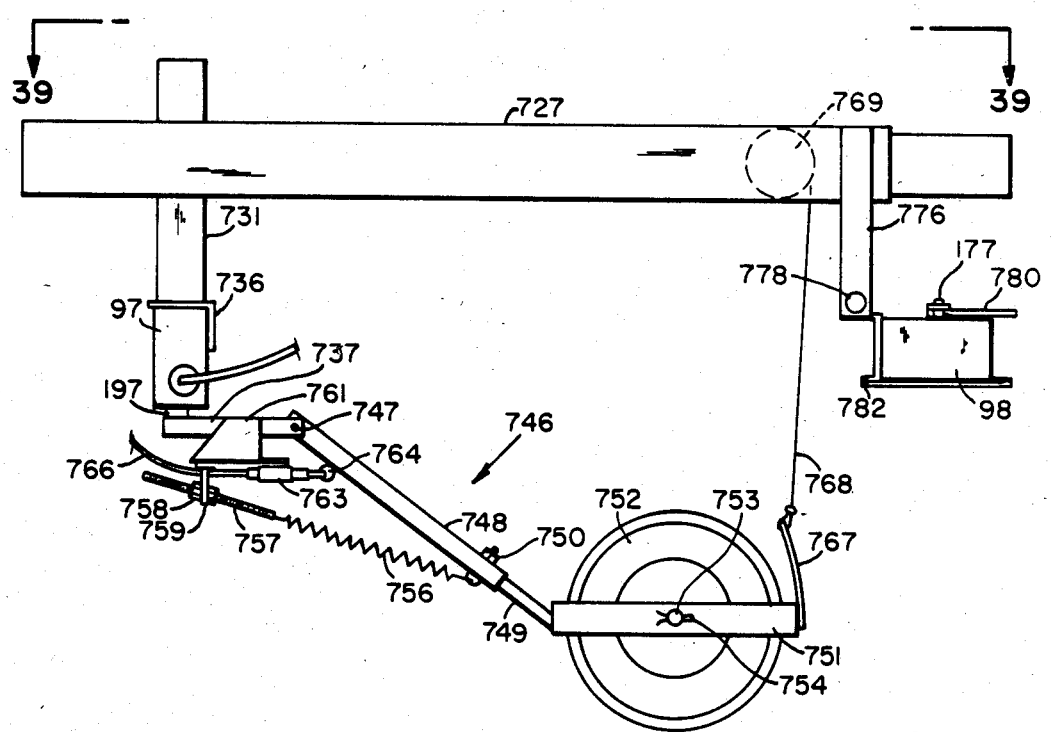
FIG.—38

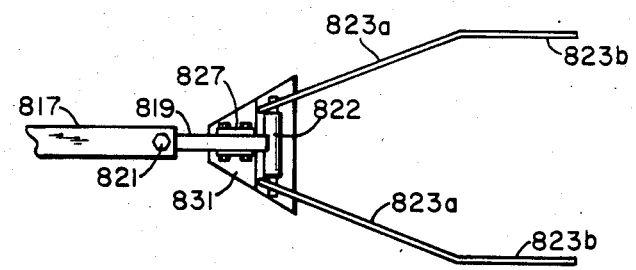
FIG.—41
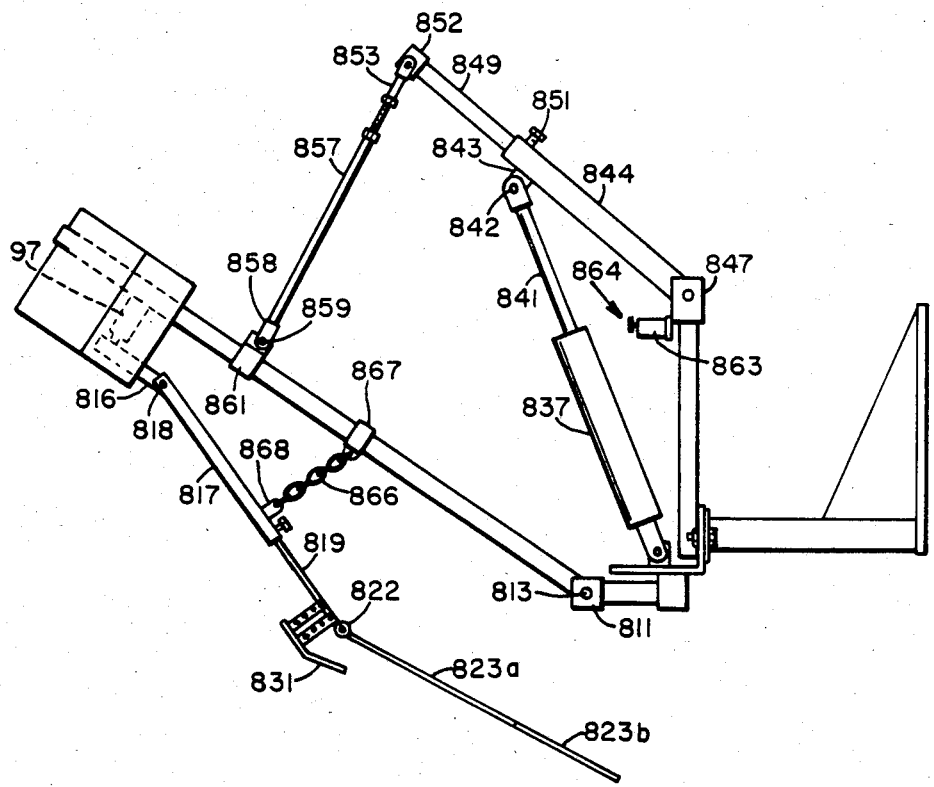
FIG.—42

AGRICULTURAL APPARATUS WITH AN AUTOMATIC POSITIONING MECHANISM AND METHOD

This invention relates to an agricultural apparatus with an automatic positioning mechanism.

In the past, mechanical markers have been utilized with various types of agricultural equipment to make a mark in the field as the operator is steering the equipment in its first pass through the field. During the subsequent pass through the field, the operator of the equipment utilizes the mark which has been made to visually steer the equipment in the field. It has been found that utilizing equipment of this type requires a skilled operator. In addition, it requires that the operator sit on the tractor equipment in the same position at all times in order to make beds of the same width and to provide uniform spacing between rows in a field. It is well-known that to use other equipment in connection with the tending of row crops planted in this manner that uniform width beds and uniform spacing between rows is essential. For example, if the rows or beds are not of uniform widths, multi-row cultivators, for example, cultivate out those plants which are not of alignment. In the meantime, it has become more difficult to obtain skilled labor for operating such agricultural equipment. Automatic steering attachments have been provided for tractors, such as those disclosed in U.S. Pat. Nos. 1,952,496 and 2,465,660. In addition, automatic steering mechanisms have also been provided of the type disclosed in copending application Ser. No. 088,412, filed on Oct. 26, 1979 and now abandoned in favor of continuation application Ser. No. 237,870, filed on Feb. 25, 1981, now U.S. Pat. No. 4,367,802, which utilizes a single arm which is swung from one side of the tractor to the other. It has been found that this is a distinct disadvantage when it is desired to provide for more than four rows at a time because of the length of arm required, as well as the additional weight and strength required to make such apparatus stand up to prolonged field use. Even when automatic steering has been provided, difficulties have been experienced in having agricultural equipment attached to or mounted on a tractor follow the tractor precisely, particularly when farming on steep slopes, such as found on hillsides. In such situations, there is often a tendency, particularly on steepers slopes, for agricultural equipment to slide sideways downhill and move out of alignment with the rows in the field. This is particularly disadvantageous for certain agricultural implements, such as cultivators in which a small amount of movement laterally will cause the cultivators to cultivate out the plants and thereby destroy the crop. Therefore, there is a need for agricultural apparatus which has an automatic positioning mechanism for preventing such occurrences. In addition, there is a need for a new and improved mechanism which can be utilized with agricultural equipment to facilitate the forming of beds with uniform widths and rows with uniform spacing which can be readily used for more than four rows.

In U.S. patent application Ser. No. 313,608, filed Oct. 21, 1981, there is disclosed a system wherein agricultural apparatus is automatically steered or otherwise positioned in a predetermined manner while moving on a field. This system, which is disclosed herein, includes a guide or following member which follows a guiding surface in the field, such as a furrow or a ridge. This movement is sensed or monitored by an electromechanical arrangement such that if the apparatus moves off a predetermined desired path, the sensed information from the guide member is utilized to correct the position or direction of the apparatus.

While the overall system has worked well, a problem has been encountered regarding the efficiency and reliability of the movement of the guide member. For example, in one arrangement, the guide is mounted on the lower end of a generally vertically extending arm, which is positioned on the outer end of a boom structure extending laterally from a tractor. The upper end of the arm is pivotally mounted on an axis which extends generally parallel to the direction of travel. Thus, when the guide member on the lower end of the arm moves in a guiding furrow, the arm can pivot laterally when the apparatus tends to stray from its intended path. It has been found that when the guide member engages the sides of the guiding surface in the field, the load on the bearings mounting the upper ends of the arm are excessively large, resulting in excessive wear on the bearings. Of more concern, in some cases, the load is such that the bearing will actually bind and the arm cannot pivot, and the apparatus does not properly function. Accordingly, a need exists to improve such automatic positioning or steering apparatus.

In accordance with the present invention, the system disclosed in the above-mentioned patent application has been improved by mounting the guide member in a manner such that it does not bind or produce unacceptable stresses on the mounting of the arm connected to the guide member. In a general sense, this is accomplished by positioning the guide member so that it trails its connection in a manner to permit the member to move easily across the ground or guiding surface.

For example, in one arrangement, the support arm extends rearwardly from its mounting on the end of a laterally extending boom such that the forward end of the member is positioned significantly to the rear of the connection for the support arm. In a preferred form of the invention, the support arm is carried on a structure which extends forwardly from the tractor, with the guide member again trailing the mounting for the support arm and the member is conveniently centrally located with respect to the tractor in that only a single tracking member is needed, as opposed to one on each side. The movement of the forward end of the towing arm is monitored by a tracking unit which forms a part of the electrical circuitry. In a preferred approach, the forward end of the arm is connected to the tracking unit in a very direct manner such that the ground engaging member is actually towed by the tracking unit and yet lateral movement of the forward end of the arm rotates a shaft in the tracking unit to sense the necessary information.

The guide member may conveniently take the form of a pair of cone-shaped, lightweight wheels which conform to the walls of a furrow, or the form of a generally V-shaped sled having trailing finger-like tines which engage the sides of a furrow or row crop plants adjacent each side of the furrow. Both of these approaches minimize the bearing load by not binding or plowing into the sides of a furrow or other guide surface.

FIGS. 1–27 and the corresponding description are disclosed in the above-referenced patent application, and FIGS. 28–29, although not disclosed in that application, illustrate another variation of the earlier system.

These disclosures are made herein as a convenient way to illustrate the present invention.

FIG. 1 is a top plan view of an agricultural apparatus with an automatic positioning mechanism incorporating an automatic steering mechanism mounted on a tractor for forming beds of uniform width.

FIG. 2 is a front elevational view of the apparatus shown in FIG. 1.

FIG. 3 is an enlarged detail view of a portion of the steering mechanism shown in FIGS. 1 and 2.

FIG. 4 is an enlarged detail view of a portion of the apparatus in FIG. 1 showing the mounting for the boom structure.

FIG. 5 is an enlarged detailed view of the boat assembly taken along the line 5—5 of FIG. 3.

FIG. 6 is an enlarged detail view showing the pivotal mounting for the boat assembly shown in FIG. 5.

FIG. 7 is a top plan view of another embodiment of the earlier agricultural apparatus mechanism utilizing an articulated tractor.

FIG. 8 is an elevational view looking along line 8—8 of FIG. 7.

FIG. 9 is an enlarged view of the drive connection utilizing the steering mechanism shown in FIGS. 7 and 8.

FIG. 10 is a plan view of the interior of the tracking unit mounted on the boom of the steering mechanism.

FIG. 11 is a cross-sectional view taken along line 11—11 of FIG. 10.

FIG. 12 is a plan view of the interior of the repeat back unit mounted on a non-steerable position of the tractor.

FIG. 13 is a cross-sectional view taken along line 13—13 of FIG. 12.

FIG. 14 is a plan view of the control console for steering mechanism.

FIGS. 15A and 15B show a circuit diagram partially in block form of the electrical circuitry utilized in the steering mechanism.

FIG. 16 is a simplified schematic diagram of the bridge portion of the electronic circuitry utilized in the steering mechanism.

FIG. 17 is a front elevational view of another embodiment of the earlier agricultural apparatus mounted on a tractor for forming beds of uniform width.

FIG. 18 is a top plan view looking along the line 18—18 of FIG. 17.

FIG. 19 is a side elevational view looking along line 19—19 of FIG. 18.

FIG. 20 is a front elevational view looking along the line 20—20 of FIG. 19.

FIG. 21 is a top plan view of another embodiment of the earlier agricultural apparatus in which an automatic steering mechanism is provided for steering the tractor and in which an additional automatic steering mechanism is provided for steering the agricultural equipment in the form of a cultivator carried by a three-point hitch on the tractor.

FIG. 22 is a cross-sectional view taken along the line 22—22 of FIG. 21.

FIG. 23 is a rear elevational view looking along the line 23—23 of FIG. 21 and particularly shows the automatic positioning mechanism in a ground engaging position.

FIG. 24 is a view similar to FIG. 23 but showing the automatic positioning mechanism raised into an out-of-the-way position out of contact with the ground.

FIG. 25 is a side elevational view looking along the line 25—25 of FIG. 21.

FIG. 26 is a top plan view of still another embodiment of an earlier agricultural apparatus in which there is shown an agricultural implement which is drawn by a drawbar secured to the tractor and in which an automatic positioning mechanism is carried by the agricultural equipment.

FIG. 27 is a cross-sectional view looking along the line 27—27 of FIG. 26.

FIG. 28 is a top plan view of still another embodiment of an agricultural apparatus showing a different following and mounting arrangement.

FIG. 29A is an enlarged view of a portion of the apparatus shown in FIG. 29.

FIG. 29B is an enlarged partial view of a portion of the apparatus shown in FIG. 29.

FIG. 35 is a view looking along the line 35—35 of FIG. 34.

FIG. 35A is a cross-sectional view taken along the line 35A—35A of FIG. 35.

FIG. 36 is an elevational view looking along the line 36—36 of FIG. 35.

FIG. 37 is a top plan view of still another embodiment of an agricultural apparatus incorporating the present invention.

FIG. 38 is an enlarged view looking along the line 38—38 of FIG. 37.

FIG. 41 is a plan view looking along the line 41—41 of FIG. 40.

FIG. 42 is a side elevational view similar to FIG. 41 but showing the apparatus in a raised position.

Figure 29:
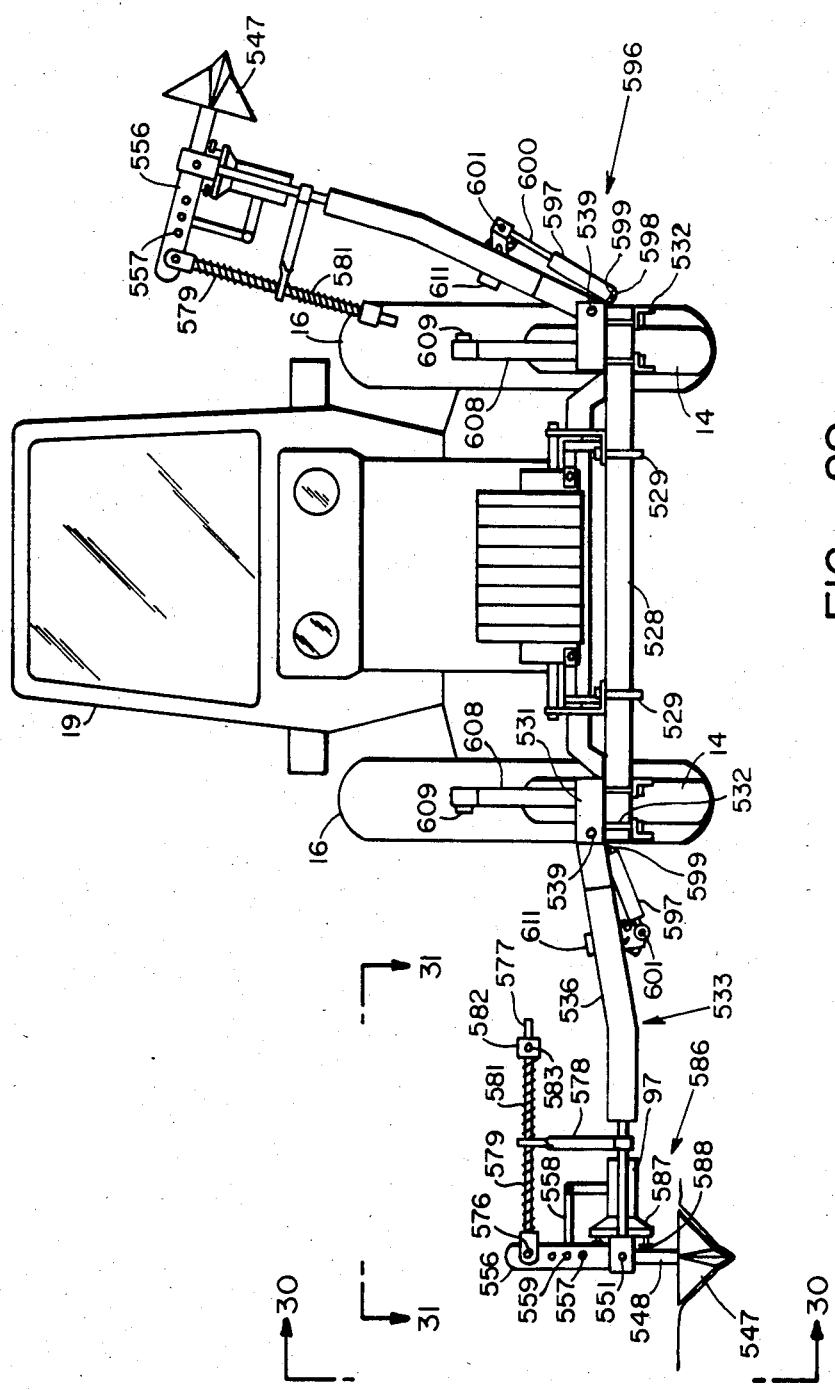
FIG. 29 is a front elevational view of the agricultural apparatus shown in FIG. 28.

The automatic steering mechanism shown in FIG. 1 is mounted upon apparatus 12 which is utilized for forming beds or rows. This apparatus 12 includes a self-propelled vehicle 13 of a conventional type such as a Series 986 tractor manufactured by the International Harvester Company. As an alternative, the vehicle can be a track laying vehicle. When the tractor is a tractor such as a Model 986 tractor, the tractor is provided with front and rear wheels 14 and 16 mounted upon a frame 17. The frame 17 carries an engine or motor on the forward extremity of the same. A cab 19 is also mounted upon the frame 17 and includes controls (not shown) therein which utilized for operating the self-propelled vehicle 13. The tractor 13 is provided with a conventional A-frame three-point hitch 21 which has mounted thereon a conventional tool bar 22. The tool bar 22 carries a plurality of spacedapart lister bottoms 23 which are utilized for forming ditches or furrows 24 in the ground, one of which serves as an indentation to be followed as hereinafter described. The furrows 24 are spaced apart so as to provide spaced apart parallel raised beds 26 having a uniform width.

The automatic steering mechanism consists of a boom structure 31 pivotally mounted on each side of the vehicle. Each of the boom structures 31 includes an outer boom 32 and an inner boom 33. The outer boom 32 is formed of a suitable material such as steel and is rectangular in cross section. The inner boom 33 is also formed of rectangular in cross section which is slidably mounted within the outer boom 32. The inner boom 33 can be slid into any position with respect to the outer boom 32 and held in the desired position by set screws 34 threaded into the outer boom 32 and adapted to engage the inner boom 33.

The boom structure 31 is adapted to be secured to one side of the front end of the wheeled vehicle or tractor 13 by suitable means. The outer boom 32 has its proximal or inner end pivotally secured to a universal mounting bracket 36 for pivotal movement about a horizontal axis extending longitudinally of the tractor 13. The bracket 36 can be secured by suitable means such as bolts 37 to a plate 38 extending forwardly of the tractor on one side of the tractor. A pair of parallel sideways extending ears 39 are mounted upon the bracket 36. The ears 39 carry a large bolt 41 which extends through cylindrical members or sleeves 42 and through the proximal end of the outer boom 32 and serve to pivotally mount the outer boom on the ears 39. The sleeves 42 are secured to the outer boom by suitable means such as welding. A brace 43 is provided for reinforcing the boom structure 31 and has one end secured to the bolt 41 and the other end secured to the outer boom 32 by suitable means such as welding.

A guiding assembly 46 is pivotally mounted on the outer or distal end of the inner boom 33. The guiding assembly consists of an arm 47 in the form of a tube which is square in cross section. The arm 47 is secured by suitable means such as welding to a bolt 48 that is carried by a pair of pillow block bearing assemblies 49 which are secured to a plate 51 by suitable means such as bolts 52. The plate 51 is secured to the outer or distal end of the inner boom 33 by suitable means such as welding. As can be seen, the plate 51 extends in a direction which is perpendicular to the longitudinal axis of the inner boom 33. The arm 47 is provided with a depending extension 53 which is secured in a desired position with respect to the arm 47 by set screws 54.

Means in the form of a follower is provided for following a mark such as an indentation in the ground in the embodiment shown in FIGS. 1 through 3 and consists of a boat assembly 56. The boat assembly 56 consists of a shell 57 that is in the form of a bow of a boat. The shell 57 is provided with a narrow bottom wall 58 which adjoins upwardly extending side walls 59 which are also tapered inwardly and forwardly to form a point 61. The upper extremities of the side walls 59 are provided with horizontally extending reinforcing rims 62. Reinforcing rods 63 are provided adjacent to the outer margins of the bottom wall 58 and extend longitudinally of the bottom wall. Similarly, additional reinforcing rods 64 are provided for the side walls 59 and extend longitudinally of the side walls. A strap 66 extends between the upper extremities of the side walls 59 adjacent to the rear extremities of the same. Means is provided for connecting the shell 57 to the extension arm 53 so as to permit swivelling or rocking motion of the shell 57 with respect to the extension arm 53 to permit the shell 57 to follow a furrow while still keeping the arm vertical. This mounting means consists of a right-angle bracket 68 having side reinforcing gussets 69. The plate 71 is secured by suitable means such as welding to the extension arm 63. However, if desired, welding it can be appreciated to facilitate replacement that the plate 71 can be bolted to the extension arm 53. A ball joint assembly 72 is provided for connecting the extension arm 53 to the plate 71. The ball joint assembly 72 consists of a socket 73 which is carried by the plate 71 and a ball 74 which is mounted in the socket and which is secured to a plate 76 by a suitable means such as a bolt 77 which extends through the ball 74. Means is provided for limiting rotational movement of the shell 57 with respect to the extension arm 53 and consists of pin-and-slot means in which a pin 78 is carried by the plate 77 and extends into an arcuate slot 79. In addition means is provided for limiting the rocking motion of the shell 57 in a generally horizontal plane and consists of bolts 81 which are mounted in the plate 71 and which are secured in an adjusted position on the plate by nuts 82 disposed on opposite sides of the plate. By adjusting the nuts 82, the amount which the bolts 81 extend towards the plate 76 can be adjusted. It can be readily seen that by adjusting the amount by which the bolts 81 extend through the plate 71, that the amount of sideways or lateral movement which will be permitted for the shell with respect to the extension arm 53 is relatively precisely determined.

Means is provided for moving the boom structure 31 from an operative position in which the means provided for following an indentation in the ground or in the field occurs and an out-of-the-way position where it is raised to an elevated position on the tractor. This means consists of a hydraulic actuator 86 in which the cylinder 87 is pivotally connected to the frame of the tractor and the piston rod 88 is pivotally connected to an ear 89 provided on the outer boom 32. As can be seen from FIG. 2, the use of the hydraulic actuator makes it possible to permit lowering of the boom structure 31 to a position in which the indentation following means engages the ground and to permit raising of the boom structure 31 from the ground engaging position into an elevated position such as shown by the position of the right hand boom assembly 31 shown in FIG. 2.

Means is provided for following the movements of the substantially vertical extension arm 53 and consists of a rod 91 which is secured by a clevis 92 to the vertically depending extension arm 53. The rod 91 is mounted in a hollow cylinder 93 and is secured in the desired adjusted position with respect to the cylinder 93 by a set screw 94. The cylinder 93 is pivotally connected to an arm 96. The arm 96 extends to a tracking control unit 97 which is carried by the outer boom 32. The tracking control unit 97 forms a part of the electrical circuitry which is utilized in the steering mechanism. The electrical circuitry also includes a steering repeat back control unit 98. The control unit 98 is mounted upon a non-steerable portion of the tractor such as the axle 99 of the tractor. The control unit 98 is driven by an arm 101. The arm 101 is pivotally connected to a threaded rod 102 which is provided with turnbuckles 103 at opposite ends. The other end of the rod 102 is pivotally connected to an L-shaped arm 104. The arm 104 is affixed to another arm 106 which is connected to a rod 107 forming a part of a conventional hydraulically controlled steering mechanism (not shown) provided for the front wheels of the tractor. The steering mechanism includes a hydraulic actuator (not shown) to which hydraulic fluid is supplied from a flow control (not shown) which, in turn is supplied by a directional valve (not shown) operated by the control boxes 97 and 98 as hereinafter described. The electrical circuitry also includes a control console 116 which is mounted on the vehicle so that it is readily accessible to the driver of the vehicle.

Means is provided for preventing the boom structure 31 from dropping to a position substantially below a generally horizontal position and consists of a chain 121 which has one end secured to the engine compartment of the tractor and which has the other end secured to one end of a spring 122. The other end of the spring 122 is secured to the plate 51. If desired, the chain 121 and the spring 122 can be replaced by another device for preventing boom structure from dropping below a substantially horizontal position. Thus, alternatively there can be provided a bracket (not shown) secured to the vehicle and extending outwardly along the boom structure 31. An upwardly extending pin (not shown) is mounted on the bracket and underlies the boom structure 31. A spring (not shown) is mounted upon the pin to support the boom structure 31 in a generally horizontal position.

Another embodiment of the invention is shown in FIGS. 7, 8 and 9 in which the steering mechanism 151 is mounted upon an apparatus 152 for forming beds and furrows. The apparatus 152 includes a self-propelled vehicle in the form of an articulated tractor 153 of a conventional type such as a Versatile tractor 153 which is provided with front and rear frames 154 and 156. The front frame 154 is provided with two pairs of driving wheels 157 mounted on opposite sides of an engine compartment 158 and a cab 159 provided to the rear of the engine compartment. The rear frame 156 is provided with two pairs of driving wheels 161. The rear frame 156 is provided with articulated connection to permit pivoting about a vertical axis provided by the pin 162 which extends through pair of spaced apart ears 164 mounted on the rear of the front frame 154 and a tongue 163 mounted on the front end of the rear frame and extending between the ears 163. The cab 159 is provided with a rear window 166. A pair of battery boxes 167 are mounted on the cab 159 below the window 166.

A three-point hitch 171 of the type hereinbefore described is provided for mounting lister bottoms of the type hereinbefore described for forming furrows and beds between the furrows. Planters also may be carried by the three-point hitch and can be used for planting seeds in the raised beds.

The steering mechanism 151 includes boom structures 173 substantially identical to the boom structures 31 provided in the previous embodiment which are secured to the front frame 154 by brackets 174. As in the previous embodiment, a tracking control unit 97 is carried by each of the boom structures 173. Similarly, a steering repeat-back control unit 98 is provided which is mounted on the rear of the cab 159 below the window 166.

Means is provided for transmitting to the steering repeat-back control unit 98 the relative pivoting of the front frame 154 of the tractor with respect to the rear frame of the tractor 153 and consists of a first swivel joint 176 which is connected to a shaft 177 by a suitable means such as a set screw 178. The shaft 177 extends into the steering repeat-back control unit. The other end of the swivel joint 176 is secured to a threaded rod 179 by a set screw 181. The swivel joint 176 is provided with a pivot point at 182. Another swivel joint 183 is connected to the other end of the rod 179 by suitable means such as a nut 184 and a jam nut 186. The other end of the swivel joint 183 is secured to a collar 187 having a set screw 188 therein. The collar 187 is welded to a nut 189 which is secured to a pivot pin 162. The swivel joint 183 pivots at 191.

Conventional hydraulic means (not shown) which includes a pair of hydraulic cylinders 192 is provided for causing steering movement of the front frame 154 with respect to the rear frame 156.

The tracking control unit 97 which is shown in FIG. 10 consists of a box-like enclosure 196 in which a shaft 197 is rotatably mounted in bearings 198 and 199 carried by the side walls of the enclosure. A gear 201 is carried by the shaft 197 and drives a small geat 202 which is mounted on a shaft 203 of a potentiometer 204 which also can be identified as a potentiometer RP-1 or RP-2 depending upon whether the right or left hand boom assembly is being referred to. The potentiometer 204 is carried by a bracket 206 mounted in the enclosure 196. First and second cams 206 and 207 are also mounted upon the shaft 197 and drive the operating arms 208 and 209 of Microswitches MS1 and MS2, respectively carried by a bracket 211.

The steering repeat-back control unit 98 is constructed in a similar manner and consists of an enclosure 216 in which the shaft 177 is rotatably mounted in bearings 217 and 218. The shaft 177 is adapted to be moved by an arm 101. The shaft carried a gear 219 which drives a small spur gear 221 mounted on a shaft 222 of a potentiometer 223 which also can be designated as the potentiometer RP-3. Cams 226 and 227 are mounted on the shaft 177 and are adapted to engate operating arms 228 and 229 of Microswitches MS3 and MS4. The Microswitches MS3 and MS4 are carried by a bracket 231.

The automatic steering mechanism also includes a control console 236 shown in FIG. 14 which typically is mounted in the cab of the vehicle so that it is accessible to the driver of the vehicle during the time that the vehicle is being operated by the operator. The control consol 236 includes a cabinet 237 which serves as an enclosure for certain components which are shown in FIGS. 15A and 15B. The cabinet 237 is provided with bosses 238 on opposite sides thereof and which have screws 239 extending therefrom which extend through a U-shaped bracket 241 carried by the tractor and which is secured to the bracket by knobs 242 threaded onto the screws 239 and serving to retain cabinet 237 in a desired angular position. The control consol includes a power on/off switch 246, a manual to automatic switch 247 and a right and left tracking switch 248. It also includes a plurality of potentiometers which include a left trim potentiometer 251, a right trim potentiometer 252, a sensitivity potentiometer 253 and a steering ratio potentiometer 254. The control console also includes a left solenoid light 256 and a right solenoid light 257. A plurality of six lights 258, 259, 260, 261, 262 and 263 are provided in which lights 258, 260, 261 and 263 are amber lights and in which lights 259 and 262 are green lights. It can be seen that the lights 258–260 constitute one set of lights for the left hand boom structure 31 and that lights 261, 262 and 263 constitute another set of lights for the right hand boom structure 31.

The electrical circuitry which is shown in FIGS. 15A and 15B also include additional elements which will be described in conjunction with the description of the mode of operation.

The operation of the automatic steering mechanism for use on an apparatus for forming beds of uniform widths in rows with uniform spacing in performing the present method may now be briefly described as follows. Let it be assumed that it is desired to start a new field with the apparatus. When this is the case, the power switch 246 is in the "off" position and the tractor is steered manually to one end of the field. Typically, the outside of the field would be selected. The driver of the tractor manually steers the tractor through its first pass through the field with the right and left boom structures 31 both being in elevated positions. As the tractor passes through the field, the lister bottoms 23 will form spaced apart parallel furrows 24 having raised beds 26 therebetween. When the end of the field is reached, the tractor operator raises the lister bottoms by the use of the three-point hitch 21 and turns about in the field and positions the tractor in such a manner so that the boom structure on the side of the tractor closest to the furrows which have been made can be lowered so that the guiding assembly 46 seats on the outermost furrow closest to the tractor. This can be accomplished by operating the hydraulic actuator 86 from a control (not shown) accessible to the operator of the tractor to lower the same so that the boom structure 31 is in a substantially horizontal position with the extension arm 53 being in a generally vertical position and with the guiding assembly 46 being disposed in the furrow. The positioning of the boom structure 31 in a general horizontal position is maintained by the action of the spring 122 and the chain 121 connected to the outer end of the boom structure 31.

As soon as the boom structure 31 has been lowered, let it be assumed that it is desired to utilize the guiding assembly 46 for guiding the tractor through the field for the next pass through the field. The power on/off switch 246 is turned to the "on" position. The appropriate right or left position is selected for the tracking switch 248 and the switch 247 is turned to the automatic position. The lister bottoms are lowered by the tractor operator into engagement with the ground. As the tractor is advanced the guiding assembly 246 moves in the furrow and the lister bottoms form additional furrows. Let it also be assumed that the arm 247 is in a substantially vertical position. When this is the case, the lights associated with the boom structure 231 depending upon whether it is the right or left hand boom structure 31, are in a position to be lighted. When the arm 247 of the left hand boom structure 31 is in a substantially vertical position, the green light 259 is lit. As hereinafter described, whenever the arm 247 is no longer vertical, one of the amber lights 258 or 260 associated with the guiding assembly 246 will be energized.

Now, as an example, let it be assumed that the tractor veers slightly off course and the arm 47 is moved from a vertical position which movement is translated by the rod 91 and the cylindrical member 93 to operate the arm 96 which in turn causes rotation of the shaft 197 (see FIGS. 2 and 10). Rotation on the shaft 197 causes rotation of the gear 201 and the gear 202 to cause movement of the wiper arm 2 of the potentiometer RP-1 of the tracking unit 97. The potentiometer RP-1 is normally adjusted so that when it is in its electrical center of the resistance element, the arm 47 is in a vertical position indicating that the tractor is on course. When the tractor goes off course, a signal passes through the wiper 2 of the potentiometer RP-1 through terminal 2 through terminal 4 which indicates by its labelling that it is connected to the left-hand trim potentiometer center tap through the left contact of the toggle switch 248 and through the terminal 7 of a printed circuit board 264 and on the printed circuit board to terminal 1 of a bias bridge network 266. It is also connected to the terminal 3 of a differential integrated circuit amplifier 267 of a suitable type such as a CA3020 supplied by RCA. The integrated circuit 267 includes dual left and right hand differential amplifiers. When a signal is supplied to the bridge network, the bridge is unbalanced and an unbalance signal is applied to the terminal 3 of the integrated circuit 267 and the left hand differential amplifier is turned on to supply a signal through terminal 4 of the integrated circuit to the base of the left hand Darlington amplifier 268. The Darlington amplifier 268 can be of a suitable type such as the RCA 8203B. As soon as a signal is supplied to the base, a signal is supplied from the collector of the Darlington amplifier through the terminals R and S of the printed circuit board to terminal 11 in a junction box (not shown) to terminal 11 in the repeat back unit 98 through the normally closed limit switch LS-3 back out through terminal 10 of the repeat back unit 98 to terminal 12 of the junction box to the left hand electrohydraulic solenoid 271 and then from the left hand solenoid 271 to terminal 15 of the junction box which is connected to the negative terminal of a suitable 12-volt DC power supply such as a battery 167 carried by the tractor. The positive side of the battery 167 as shown in FIG. 15A is connected to a terminal 17 of the junction box through a fuse 273 to terminal 16 of the junction box through the on/off switch 246 and is connected to terminals 12 and 13 of the printed circuit board 264 to energize a separate oscillator power supply 274, consisting of a transistor 276 of a suitable type such as a 2N5783 which creates a conventional flyback oscillator transistor circuit that creates a higher voltage for the repeat back potentiometer and tracking potentiometer circuits. This circuit through transformer action provides an output voltage which is isolated from the 12-volts DC supply. The oscillator power supply 274 includes a transformer 277 which supplies its output through a rectifying diode 278 and a filtering capacitor 279 through a limiting resistor 281 to a voltage regulator 282 of a suitable type such as number 7818 supplied by RCA. The output of the regulator 282 is filtered by a capacitor 283. The output of the regulator 282 is supplied through terminal 1 of the printed circuit board through the left terminal to the center tap of the potentiometer 251B of the dual trim potentiometers 251A and 251B operated by the knob 251. The wipers on the dual steering ratio potentiometers 254A and 254B are connected to the output of the regulator 282. The wiper for the potentiometer 254A is connected through terminal 3 of the printed circuit board to the negative output of the regulator 282. The wiper of the potentiometer 254B is connected to the positive side of the output from the regulator 282. The dual potentiometers 254A and 254B are connected in series with each end of the repeat back potentiometer RP-3. Terminal 1 of the repeat back potentiometer RP-3 is connected through terminal 8 to terminal 1 of the potentiometer 254B. Terminal potentiometer RP-3 is connected to terminal 9 and to the terminal 1 potentiometer 254A. The wiper of the repeat back potentiometer RP-3 is connected through terminal 10 through terminal 8 of the printed circuit board 264 to terminal 2 of the bridge 266. It is also connected to terminal 2 of the integrated circuit CA3020.

It can be seen that by adjustment of the steering ratio potentiometers, 254A and 254B equal resistance is added or subtracted on each end of the steering ratio potentiometer or on each end of the repeat back potentiometer RP-3. This allows a change in the electrical ratio between the repeat back unit 98 and the tracking units 97.

The trimming potentiometers 251A, 251B and 252A and 252B are connected to the tracking potentiometers RP-1 and RP-2 in such a manner so as to add or subtract resistance form one side of the tracking potentiometer so that the electrical center of the tracking potentiometer is unbalanced to compensate for error in the steering as it originally was set up for causing straight steering of the tractor. Terminals 1, 2 and 3 of the repeat back potentiometer RP-1 are connected to terminals 5, 4 and 6 respectively. Terminal 4 is connected through terminal L and then to the switch 248 through the terminal 7 of the printed circuit board to terminal 1 of the bridge 266 and to the terminal 3 of the integrated circuit CA 3020. Terminal 5 is connected to the wiper terminal 2 of the trim potentiometer 251B and terminal 6 is connected to the wiper terminal 2 of the trim potentiometer 251A. Terminals 1, 2 and 3 of the right tracking potentiometer RP-2 are connected to the terminals 3, 2 and 7, respectively. Terminal 2 is connected to the terminal R and also to the terminal 1 of the bridge 266 and to the output 3 of the integrated circuit 267. Terminal 3 is connected to the center tap of the potentiometer 252B and terminal 7 is connected to the center tap of the potentiometer 252A.

The lights 258, 259, 260 and 261, 262 and 263 are connected to the 12-volt DC. The positive side of the 12-volt power supply 267 is connected through the tracking mode switch 248 through the right or left hand terminal depending upon which tracking mode has been selected. If the right hand tracking mode has been selected, a positive 12-volt DC is supplied to the right hand terminal of the left hand light 261 of the right hand lights which is an amber light. The other side of the light is connected to terminal 11 of the right tracking unit 97. As soon as the cam 207 is moved to cause closure of the normally open contract, the left hand light of the right hand lights is energized by a circuit which passes through terminal 12 of the right hand tracking unit 97 and thence to terminal 15 which is connected to the negative terminal of the power supply 267 to cause energization of the amber light 261 and at the same time turn off the green light 262 at the time the normally closed contact is opened. The other lights in the control console 236 are operated in a similar manner.

The sensitivity potentiometer RP-4 has terminals 1, 2 and 3 connected to terminals 10, 9 and 5, respectively, in which terminal 5 is connected to the output of a regulator 286 of a suitable type such as number 7885 supplied by RCA. 12-volt DC is supplied from terminals 12 and 13 through diode 287, a filter capacitor 288 and a choke 289 to the input of the regulator 286. Terminal 5 is also connected to terminal 9 of the integrated circuit 267. Terminal 10 is connected through a 1K resistor 291 to terminal 12 of the integrated circuit 267. The center tap terminal 9 is connected to terminal 3 of the bridge 266. Terminal 4 of the bridge 266 is connected to the 12-volt minus supply through terminals 14 and 15 of the circuit board. The output of the regulator 286 is filtered by a filter capacitor 292.

In FIG. 16 there is shown an arrangement in which the steering ratio potentiometers and the trim potentiometers are associated with a tracking potentiometer and a repeat back potentiometer as well as the two power supplies, namely the 12-volt DC power supply and the 24-volt power supply.

As the wipers of the potentiometers are moved, one of the amplifiers of the dual differential amplifier of the integrated circuit 267 is unbalanced. This turns on one of the two Darlington amplifiers 268 and 269 to thereafter cause operation of the associated electrohydraulic solenoid to operate the steering mechanism to bring the tractor back on course.

If the tractor tends to steer to the right due to an unbalance of tractor load or to slide off the center setting on the tracking potentiometer RP-1, the trim control is used to change the electrical center of the potentiometer RP-1 so as to compensate for this condition. It is accomplished by turning trim control potentiomenters 251A and 251B counterclockwise from its mid-point, thus increasing resistance to the negative side of the tracking potentiometer RP1 and decreasing the resistance by an equal amount on the positive side of the potentiometer RP-1. This shifts the wiper 2 of the potentiometer RP-1 electrically to the left thus neutralizing the right steering condition. Similar circuitry is provided for the other tracking potentiometer RP-2.

From the circuitry herein described, it can be seen that circuitry is provided for each of the boom structures provided on the tractor and that it can be used for precisely guiding the tractor through the field without hunting. When the end of the field is reached, the boom structure is again raised. The lister bottoms are lifted out of the ground and the operator operates the switch 247 to manual operation at which time the operator assumes control of the tractor and turn it about in the field. The operator then lowers the other boom structure into the furrow and operates the switch 247 to again place the steering mechanism in automatic condition under the control of the guiding assembly carried by the boom structure to operate the electrical circuitry as hereinbefore described to steer the tractor through the field.

From the foregoing, it can be seen that the tracking unit in effect follows the indentation in the ground and when there is a shift from a true on-course position, an unbalance is created through the bridge network to cause a signal to be supplied to the appropriate solenoid to cause a change in the steering and a change in a direction of movement of the tractor. The repeat back unit 98 senses a change of the wheel positions and generates a signal which is supplied to the bridge and neutralizes the voltage when has been supplied to the bridge network by the tracking unit which causes the steering mechanism to continue steering in the direction given by the tracking signal. This continues until the tractor has been moved sufficiently to cause an opposite movement of the arm of the tracking unit. For example, this could occur when the tractor has changed its course sufficiently so that it is now back on the track it should be on and the vertical arm carried by the boom structure for the tracking unit is again moved to cause a change in position of the tracking potentiometer. An unbalance voltage is again supplied to the bridge in the manner hereinbefore described and this unbalanced voltage is neutralized by the signal received from the repeat back unit after it has occurred. The tractor should now be on course.

The dual trim potentiometers as hereinbefore explained are in series with the tracking potentiometer and can be utilized for adding some tracking resistance to the tracking potentiometer. By adding or subtracting this resistance, it is possible to electrically move the wiper contact point of the tracking potentiometer.

By adjusting the steering ratio potentiometer, it is also possible to add and subtract resistance on each end of the repeat back unit potentiometer. This makes it possible to adjust the responsibility of the repeat back unit and adjusting what given voltage change must occur before a correction will be made in the steering of the tractor.

Adjustment of the sensitivity potentiometer controls the cut-off points of the amplifiers in the integrated circuit CA3020. The limit switches in the repeatback unit serve to turn the steering off before damage can occur to the steering mechanism in the event that there is a tendency to oversteer.

Another embodiment of the automatic steering mechanism is shown in FIGS. 17-20. In the embodiment of the automatic steering mechanism shown in FIGS. 1-16, the automatic steering mechanism is particularly adapted for use on apparatus for forming raised beds with furrows therebetween with uniform spacing. In the embodiment of the invention shown in FIGS. 17-20 the automatic steering mechanism is particularly adapted for use on apparatus which forms raised ridges and in which lowered beds are formed between the raised ridges. When raised beds are provided, the planting takes place on the raised beds. When the lowered beds are provided, the planting takes place in the lowered beds.

With the automatic steering mechanism shown in FIGS. 17, 18, 19 and 20, a self-propelled vehicle 13 of the type hereinbefore described is provided for carrying the automatic steering mechanism. The automatic steering mechanism consists of a boom structure 301 which is pivotally mounted on each side of the tractor 13. Each boom structure 301 includes an outer boom 302 and an inner boom 303. Both the outer boom 302 and the inner boom 303 are formed of tubes which are circular in cross section. The inner boom 303 is slidably mounted in the outer boom 302 and is held in the desired position by set screws 304 threaded into the outer boom 302 and engaging the inner boom 303. The boom structure 301 also includes a plate 306 which is secured to the framework 17 by suitable means such as bolts (not shown). A pair of spaced apart ears 307 are mounted on the plate 306 and carry a pin 308. The inner or proximal end of the outer boom 302 is carried by the pin 308 which serves as a pivot axis for the outer boom 302.

A guiding assembly 311 is pivotally mounted on the outer or distal end of the inner boom 303. The guiding assembly 311 consists of a tubular arm 312 which is square in cross section. The upper end of the arm 314 is carried by a pin 316 rotatably mounted in a pair of pillow block bearing assemblies 317 that are mounted upon a plate 318 mounted on the distal end of the inner boom 303. An angular cover 319 is mounted on the inner boom 303 and extends over the outer end of the arm 314.

As in the previous embodiment of the automatic steering mechanism, means in the form of a follower is provided for following a mark such as a raised ridge which has been formed in the ground and consists of a V-shaped guiding structure 321. The V-shaped guiding structure 321 consists of a pair of elongate flat plates 322 and 323 which are fastened together by a suitable means such as welding so that each of the plates extends downwardly and outwardly to provide a structure which in cross section is in the form of an inverted V. The forward or leading extremities of the plates 322 and 323 are provided with outwardly turned lip portions 322a and 323a.

Means is provided for securing the V-shaped guide structure 321 to the arm 314 and consists of a bracket 326 which is secure to the lower extremity of the arm 314 by suitable means such as welding. The V-shaped bracket 326 is pivotally connected to the upper extremity of the V-shaped guide structure 321 by a pin 327. As can be seen, the V-shaped guide structure 321 is adapted to be guided by raised ridges 331 which have been formed in the ground by lister bottoms of the type hereinbefore described in connection with the previous embodiment to form parallel spaced ridges 331 in the ground between which there are formed lowered beds 332 in which the seeds can be planted. This is in contradistinction to the use of the raised beds in which the seeds are planted in conjunction with the automatic steering mechanism described in the previous embodiments.

Means is provided for yieldably restraining movement of the arm 314 by the V-shaped guide structure 321 engaging a ridge 331 and consists of a downwardly depending arm 336 which is secured to the outer extremity of the outer boom 302. A threaded rod 337 has one end secured to the downwardly depending arm 314 at a point which is adjacent to the upper extremity of the V-shaped structure 321 and extends horizontally inwardly therefrom through the arm 336. Helical springs 338 are concentrically mounted on the rod 337 on opposite sides of the arm 336 and are placed under a predetermined compression by nuts 339 threaded onto the rod 337. By adjusting the compression on the springs 338, the amount of force required to be exerted by the V-shaped guide structure 321 to move the arm 314 can be adjusted. It has been found that the use of such springs 338 is particularly advantageous in that it inhibits movement of the arm 314 by clods, rocks and the like. The V-shaped guide structure 321 rather than being moved by such clods or rocks, will be deflected out of the way. This permits the guide structure 321 to more closely follow the ridge itself rather than aberrations in the ridge caused by rocks or clods in the ridge.

Means is provided for sensing the movement of the arm 314 as the lower extremity is guided by the guide structure 321 and consists of a rod 341 which has a clevis 342 mounted thereon which is secured by a pin 343 to an ear 344. The ear 344 is mounted on a post 346 mounted on the arm 314 and extends rearwardly therefrom. The other end of the rod 341 is provided with another clevis 347 which is connected by a pin 348 to an arm 96 of a tracking control unit 97 of the type hereinbefore described which is carried by the outer boom 302.

Means is provided for moving the boom structure 301 from an operative position in which it is generally parallel to the ground to a raised or out-of-the way position in which it is out of engagement with the ground. This means consists of a hydraulic actuator 351 in which the cylinder 352 is pivotally connected to the frame 17. The hydraulic actuator 351 also includes a piston rod 353 which has a clevis 354 mounted thereon pivotally connected by a pin 356 to an upstanding ear provided on the top side of the outer boom structure 302. As can be seen from FIG. 17, the use of the hydraulic actuator 351 makes it possible to lower the boom structure 301 into a position in which the V-shaped guide structure 321 comes into a ground engaging position in which it travels on one of the ridges 331. Operation of the hydraulic actuator 351 by the operator in the cab of the tractor also makes it possible to raise the boom structure 301 to an out-of-the-way position in which it is out of engagement with the ground as shown by the position of the left hand boom structure in FIG. 17.

The operation and use of the automatic steering mechanism shown in FIGS. 17-20 is generally very similar to that hereinbefore described in connection with the previous embodiments. The principal difference in the operation is that the V-shaped guide structure 321 which is secured to the lower extremity of the guiding arm 314 is adapted to travel on ridges 331 formed in the ground in contradistinction to the other embodiments in which a boat assembly is secured to the lower extremity of the arm and travels in the furrows between raised beds. It can be seen that as the tractor 13 veers out of position, this change of position of the tractor will be sensed by a change in angular position of the arm 314 to cause movement of the arm 96 for the tracking control box 97 to cause the tractor 13 to be steered so that it returns to the desired position traveling down the field in the manner hereinbefore described with the previous embodiments. As pointed out above, the springs 338 serve as restraining means for preventing deflection of the V-shaped guide structure 321 by any clod or stone in the ridge but rather will cause the guide structure 321 to follow the ridge and to move the clods or stones to out-of-the-way positions. In this way, the tractor will be steered straight down the field following the ridges 331 which have been formed in the field.

Another embodiment of an agricultural apparatus with an automatic positioning mechanism is shown in FIGS. 21-25. The agricultural apparatus consists of a self-propelled vehicle 13 in the form of a tractor as hereinbefore described. The self-propelled vehicle 13 is provided with a three-point hitch 376 of a conventional type which is attached to an elongate bar 377. A cultivator consists of first and second tool bars 381 and 382. The tool bar 382 is secured to the bar 377 by two pairs of links 383 with one of the ends of each of the links being pivotally connected by pins 384 to the bar 377 and with the other end of each of the links being pivotally connected to the tool bar 381 by pins 386. The tool bar 386 is secured to the tool bar 381 by a plurality of elongate bar members 387 which are secured to the tool bars 381 and 382 by tool bar clamps 388 and 389. Gang frames 391 are secured to the tool bar 381 at spaced apart intervals by tool bar clamps 392. The gang frames 391 carry a plurality of spring tine shanks 393 which cultivate the soil on opposite sides of the rows 394 of plants as can be seen from FIG. 21. As shown in FIG. 21, the rows 394 of plants are provided on raised beds 396 disposed between furrows 397. Cultivator shovels 398 are provided which is secured to shanks 399 mounted on the tool bar 382 by tool bar clamps 401. The cultivator shovels 398 serve to reestablish the furrows 397 after the cultivator 378 has passed over the ground.

An automatic positioning mechanism 406 is mounted on the cultivator. The positioning mechanism 406 as shown particularly in FIGS. 21 and 22 consists of an arm 407 which has its upper end pivotally mounted on a pin 408 for pivotal movement about a horizontal axis formed by the pin which extends in a direction parallel to the path of travel of the cultivator over the ground. The tool bars 381 and 382 with their interconnections serve as a framework for the cultivator. The pin 408 is secured to the tool bar 381 generally equidistant between the ends of the same. An extension 409 is slidably mounted in the arm 407 to permit vertical adjustment of the same within the arm 407. The extension 409 is held in the desired adjusted position by screws 411. A boat assembly 412 of the type hereinbefore described is secured to the lower extremity of the extension 409. The arm 407 extends downwardly from the tool bar 381 and forms a predetermined angle with respect to the tool bar 381.

Means is provided for sensing the movement of the arm 407 from its predetermined angle and includes a linkage of the type hereinbefore described for the other embodiments herein disclosed. The linkage of the present invention consists of a rod 416 which is pivotally connected at 417 to ears 418 secured to the arm 407. The other end of the rod 416 is secured by a clevis 419 which is pivotally connected to the arm 96 of the tracking control unit 97 which is mounted on the tool bar 381. The tracking unit 97 forms a part of the electrical apparatus as disclosed in conjunction with the previous embodiments of the invention to provide hydraulic fluid to a hydraulic actuator 421. The hydraulic actuator consists of a cylinder 422 which is pivotally connected at 423 to the tool bar 377 secured to the three-point hitch 376. The hydraulic actuator 421 includes a piston (not shown) which is connected to a piston rod 424. The piston rod 424 is connected by a pin 426 to the links 388. In this way it can be seen that the hydraulic actuator 421 has one end of the same connected to a portion of the framework and has the other end connected to another portion of the framework so that by operation of the actuator means, relative movement is created between the portions of the framework. Thus by way of example, the portion to which the cylinder 422 is attached can be considered to be a first or one portion whereas the links 388 to which the piston rod 424 is connected can be considered to be a second or another portion of the framework. The electrical apparatus also includes a repeat-back control unit 98 having an operating arm 101 of the type hereinbefore described. The arm 101 is pivotally connected by pin 429 to a rod 427. The rod 427 is pivotally connected by a pin 428 to the link 483.

Operation of the apparatus shown in FIGS. 21 and 22 may be briefly described as follows: Let it be assumed that the tractor and the cultivator are being used on hillside land with the boat assembly 412 traveling in a furrow. In the event that there is some slippage of the cultivator during the cultivating operation as, for example, downhill, such movement will be immediately sensed by the angle of the arm 407 changing from its predetermined angle and causing movement of the linkage including the rod 416 to cause operation of the tracking unit 97. Operation of the tracking unit as hereinbefore described will cause hydraulic fluid to be supplied to the hydraulic actuator 421 to cause a force to be applied to tend to return the cultivator 378 to its proper position.

The electrical circuit means which is utilized in the embodiment of the invention shown in FIGS. 21-22 includes, in addition to the tracking control unit 97, a repeat-back control unit 98 and a control console 236 (not shown), all of which can be identical to that hereinbefore described in connection with earlier embodiments of the present invention. This electrical circuit means causes a signal to be supplied to solenoid operated valves hereinbefore described to supply fluid to the hydraulic cylinder 422 to cause actuation of the same to cause retraction or extension of the piston rod 424 to thereby cause movement of one portion, namely the portion including the equipment mounted on the tool bars 381 and 382 with respect to another portion namely the bar 397 of the framework of the agricultural apparatus to thereby maintain the tool bars 281 and 282 and the equipment carried thereby in proper registration with the rows of plants 394. This ensures that the agricultural apparatus will properly cultivate the plants and not destroy the plants and to overcome any tendency of the cultivator to slide laterally one way or the other. This is particularly important with respect to hillside farming operations in which there is a great tendency for the agricultural equipment such as a cultivator to slide down hill.

By providing the automatic positioning mechanism hereinbefore described, such tendencies can be overcome and the agricultural apparatus can be maintained in proper registration with the beds, furrows and plant rows. As hereinbefore explained, this registration is maintained by sensing any change of the angular position of the arm 47 with respect to a predetermined angle in which the arm 407 extends. It should be appreciated that normally, the arm 407 would extend in a vertical direction but it is readily apparent that if desired, other predetermined angles can be utilized for the arm 407 and still accomplish the same purpose.

Although the agricultural apparatus which is hereinbefore described in connection with the embodiment shown in FIGS. 21 and 22 can be utilized without providing automatic steering for the tractor 13. However, it may be desirable in certain applications in addition to providing the automatic positioning mechanism for the agricultural apparatus by providing such a mechanism for positioning agricultural equipment such as a cultivator which is utilized to provide an automatic positioning mechanism in the form of an automatic steering mechanism for the tractor.

As shown in FIGS. 21, 23, 24 and 25, such an automatic steering mechanism 431 consists of a boom 432 which has its innermost end pivotally connected by a bolt 433 to a pair of ears 434 mounted on the framework 18. An arm 426 is pivotally connected by a pin 437 to the outer extremity of the boom 432 and depends downwardly therefrom at a predetermined angle. As can be seen from FIG. 21, the boom 432 extends outwardly in a lateral direction from the frame 18 of the tractor and the arm 436 extends vertically therefrom and is adapted to pivot about a horizontal axis which is parallel to the normal direction of travel of the tractor 13. A carriage 438 is mounted on the lower extremity of the arm 436 and consists of a bar 439 which is provided with upstanding ears 441. A pin 442 extends through the ears 441 and the lower extremity of the arm 436 and serves to pivotally mount the bar 439 at a point equidistant between the ends of the same about a horizontal axis which is at right angles to the direction of travel for the tractor 13. A pair of coulters 433 mounted on bearings 444 are provided. The bearings 444 are rotatably mounted upon stub shafts 446 mounted in opposite ends of the bar 439 and extends outwardly therefrom in a horizontal direction which also is perpendicular to the line of travel for the tractor 13. Nuts 447 retain the coulters 443 on the stub shafts 446. Means is provided for sensing the movement of the arm 436 from a predetermined angle with respect to the direction of travel of the tractor 13 and consists of a rod 448 which is provided with turnbuckles 449 at opposite ends with one turnbuckle 449 being secured to the arm 96 forming a part of a tracking control unit 97 mounted on the boom 432. The tracking control unit 97 forms a part of an electrical circuit means or apparatus of the type hereinbefore described which also includes a repeat back control unit 98 and a control console 236 as described in the previous embodiments. Means is provided for moving the steering mechanism as shown in FIGS. 23-25 from a ground engaging position to an out-of-the-way position in which the coulters 443 are out of engagement with the ground and consists of a hydraulic actuator 456 which consists of a hydraulic cylinder 457 that is pivotally connected by a pin 458 to ears 459 mounted on the framework 18. It also includes a piston rod 461 which is pivotally connected by a pin 462 to ears 463 secured to the bottom side of the arm 432. It can be seen that as hydraulic fluid is supplied to the cylinder 457, the boom 432 can be raised and lowered as shown in FIGS. 23 and 24. When in a raised position, the coulters 443 are out of engagement with the ground.

In using the agricultural apparatus shown in FIGS. 23-25, in conjunction with the automatic steering mechanism shown in FIGS. 23 and 24, the tractor can be moved into the desired position in the field and pointed in the proper direction. At this time, the hydraulic actuator 456 can be actuated to lower the coulters 443 into the ground. Since two of the coulters are provided on the carriage 438, the coulters will penetrate the ground and will travel in a straight line. This makes it possible to utilize the automatic steering mechanism in fields in which the ground is flat and in which there has not been earlier formed a furrow or a raised ridge which can be tracked as disclosed in conjunction with the hereinbefore described embodiments of the present invention.

The coulters 443 will travel in a straight line and will cause the tractor to be steered in a straight line. In the event a bump or a rock is encountered by one of the coulters that coulter will merely raise up out of the ground to pass over the rock and the other coulter will be forced more deeply into the ground to maintain the alignment of the carriage 438. As soon as the front coulter 443 has cleared the rock or other obstruction, and the rear coulter 443 engages the same, the forward coulter will be depressed further into the ground so that it will maintain the alignment of the carriage in its travel through the field.

In the event there is any tendency of the tractor to tend to veer off course, this veering off course will be sensed by movement of the arm 436 through the electrical circuit means operating in the manner hereinbefore described in conjunction with the previous embodiments to keep the tractor on course.

When it is desired to turn the tractor about in the field, the automatic steering mechanism can be raised by operation of the actuator 456. After the tractor has been turned about in the field and again properly positioned with respect to the previous work which has been done in the field, the automatic steering mechanism 431 can be lowered by operation of the hydraulic actuator 456 to make the next pass through the field.

It should be appreciated that if desired, the agricultural apparatus can be utilized solely with the automatic steering mechanism 431 disclosed in the present embodiment without the use of the automatic positioning mechanism 406 disclosed. Conversely, the automatic positioning mechanism 406 can be utilized without the automatic steering mechanism 456. Also it should be appreciated that the automatic steering mechanisms of the previous embodiments can be utilized in place of the automatic steering mechanism 431 disclosed in conjunction with the present embodiment and that the automatic steering mechanism of the present invention can be used on the boom structures of the earlier embodiments.

Still another embodiment of the agricultural apparatus is shown in FIGS. 26 and 27. It differs principally from the agricultural apparatus shown in FIGS. 21-25 in that pull-type agricultural equipment is utilized which is self-supported rather than using agricultural equipment of the type which is carried by a three-point hitch mounted on the tractor 13. As can be seen from FIG. 26, the agricultural equipment 476 consists of a U-shaped framework 477 which is supported with respect to the ground by a pair of rubber tired wheels 478 that are mounted on bearings 479 carried by stub shafts 481. The stub shafts 481 are mounted upon support members 482. The support members 482 are rigidly mounted on a tube 483. The tube 483 is provided with pins 484 on opposite ends thereof which are rotatably mounted in brackets 485 mounted on the framework 477. Plates 486 are secured to the tube 483 and are pivotally connected by pins 487 to a piston rod 488 of a hydraulic actuator 489. The hydraulic actuators 489 include cylinders 491 which are pivotally connected to the frame 477 by pins 492. It can be seen that by supplying hydraulic fluid to the cylinder 491, the framework 477 can be raised and lowered with respect to the ground.

The agricultural equipment 476 shown in FIG. 26 also includes tool bars 381 and 382 which carry the tines 393 and the shovels 398 in the manner described in connection with the embodiment shown in FIGS. 21-25. The agricultural equipment 476 includes a tow bar 496 which also has its rear extremity connected to a U-shaped member 497. The U-shaped member 497 is connected a pin 498 to a bracket 499 which is secured to the front extremity of the U-shaped framework 477. The front end of the tow bar 496 is connected to a clevis 501 which is connected by a pin 502 to a drawbar 503 carried by the tractor 13.

An automatic positioning mechanism of the type hereinbefore described is provided for in the pull-type agricultural equipment 476. As can be seen, the automatic positioning mechanism includes a tracking control unit 97 which is mounted on the tool bar 381 with the associated arm 407 which is disposed at a predetermined angle and which is utilized for determining the positioning of the agricultural equipment 476. It also includes a repeat-back control unit 98 which is mounted on the U-shaped frame with the rod 427 being pivotally connected by the pin 429 to ears 506 mounted on the tow bar 496. It also includes a hydraulic actuator 421 of the type hereinbefore described in connection with the previous embodiment shown in FIGS. 21-25. The cylinder 422 is pivotally connected by a pin 423 to ears 507 secured to the tow bar 496 and by the pin 426 secured to ears 408 mounted on the forward extremity of the frame 477.

Operation of the embodiment of the agricultural apparatus shown in FIGS. 26 and 27 is similar to that hereinbefore described in conjunction with FIGS. 21-25. The automatic positioning mechanism 406 operates in a very similar manner and serves to maintain the agricultural equipment 476 in registration with the crops being cultivated. Any tendency of the agricultural equipment 476 to move out of registration would be corrected by operation of the hydraulic actuator 421 to maintain the agricultural equipment 476 in position so that it will run true and follow the tractor. Any operation of the actuator 421 will cause one portion of the agricultural apparatus namely the framework 477 with the tow bars 381 and 382 carried carry and the associated agricultural implements in the form of the tines 393 and the shovels 398 to be moved with respect to another portion of the framework which in this case consists of the towbar 496 secured to the draw bar 503 of the tractor 13. Any tendency of the framework 477 to shift will cause angular movement of the arm 407 which movement will be sensed by the electrical circuit means to cause the appropriate correction to be supplied to the hydraulic actuator 421.

Figure 30:
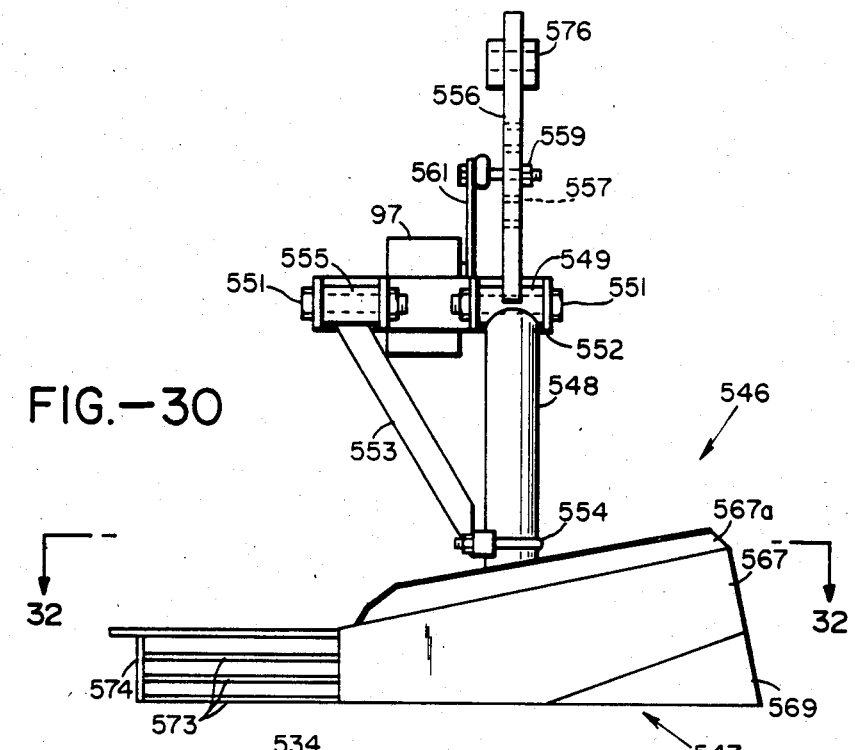
FIG. 30 is a view taken along the line 30—30 of FIG. 29.
Figure 31:
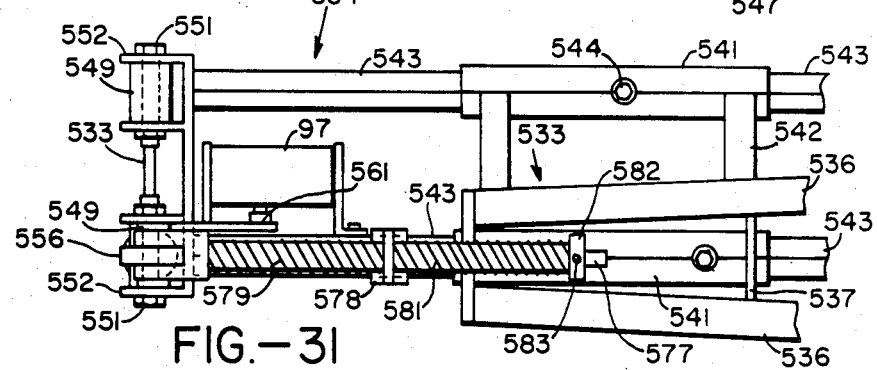
FIG. 31 is a view looking along the line 31—31 of FIG. 29.

Still another embodiment of the automatic steering mechanism is shown in FIGS. 28, 29 and 30 and can be characterized as the "short-arm version". The automatic steering mechanism 526 is mounted on a conventional tractor 13 of the type hereinbefore described. The mechanism 526 consists of a boom structure 527 pivotally mounted on each side of the vehicle 13. The boom structures 527 are pivotally mounted on a cross member 528 secured to the front of the tractor 13 by suitable means such as U-bolts 529. A bracket 531 is secured at each end of the cross member 528 and is secured to the end of the cross member 528 by U-bolts 532 (FIG. 29).

Each of the boom structures 527 consists of a primary framework 533 and a secondary framework 534. The primary framework 533 consists of two tubes 536 which are rectangular in cross section which have braces 537 secured to the same by suitable means such as welding at various points along the lengths of the same. Elongate plates 538 are welded to the tubes 536 and are pivotally connected to the brackets 531 by the use of bolts 539. The tubes 536 are inclined so they form an A-shaped primary framework 533 with the apex being formed at the outer extremity of the framework remote from the pivot point on the cross member 528 formed by the bolts 539. The primary framework also includes a pair of spaced apart and parallel hollow tubes 541 which are rectangular in cross section. The tubes 541 are secured to the outer extremities of the tubes 536 by braces 537 and 542.

The secondary framework 534 consists of a pair of hollow tubes 543 which are rectangular in cross section but of a size slightly less than that of the tubes 541. The tubes 543 are slidably disposed within the tubes 541 and extend in a direction which is generally in the same plane as the primary framework 533. Means is provided for retaining the tubes 543 in adjusted positions with respect to the tubes 541 and consists of set screws 544 threaded into the tubes 541 and adapted to engage the tubes 543 to hold them in a desired position in the tubes 541. This slidable adjustment as hereinafter pointed out is provided to accommodate different row spacing. The two tubes 543 extend in directions generally parallel to each other so that when the boom structure 527 is in a lowered position, one of the tubes can be characterized as the forward tube and the other as being the rear tube.

A guiding assembly 546 includes a boat 547 which is adapted to track a furrow is pivotally mounted on the outer extremity of the secondary framework 534. The boat 547 is carried by a generally vertical arm 548 in the form of a cylindrical tube 548. The upper extremity of the cylindrical tube 548 is secured by suitable means such as welding to a bushing 549 which is rotatably mounted on a bolt 551 carried by ears 552 mounted on the outer extremity of the secondary framework 534. A brace 553 is provided and has its lower extremity secured by a clamp 554 to the vertical arm 548. The upper extremity of the brace 553 is inclined rearwardly and is secured to a bushing 555 rotatably mounted on the outer extremity of the secondary framework 534 by another bolt 551 mounted on ears 552 carried by the other tube 543. An upwardly extending bar 556 is provided which is secured to the rear extremity of the bushing 549 secured to the vertical arm 548. The bar 556 is provided with a plurality of vertically spaced holes 557. A link 558 is adapted to be adjustably positioned in the holes 557 by a bolt 559. The other end of the link 558 is pivotally connected to an arm 561 which is connected to the tracking control unit 97 carried by the outer extremity of the secondary framework 534.

Figure 32:
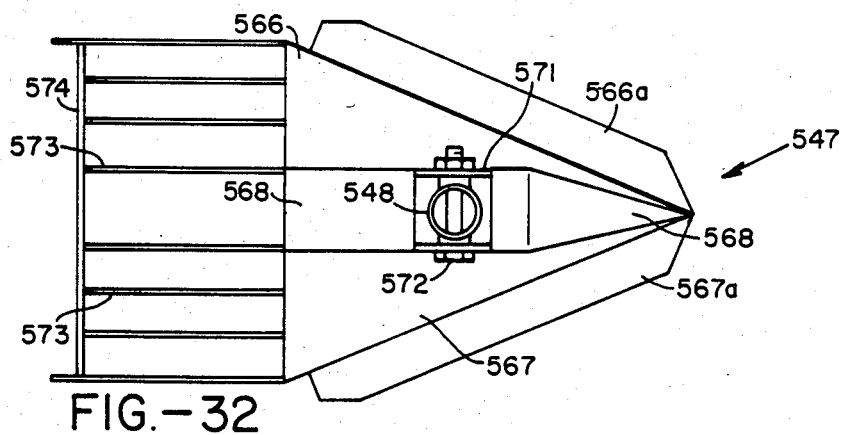
FIG. 32 is a cross-sectional view taken along the line 32—32 of FIG. 30.
Figure 33:
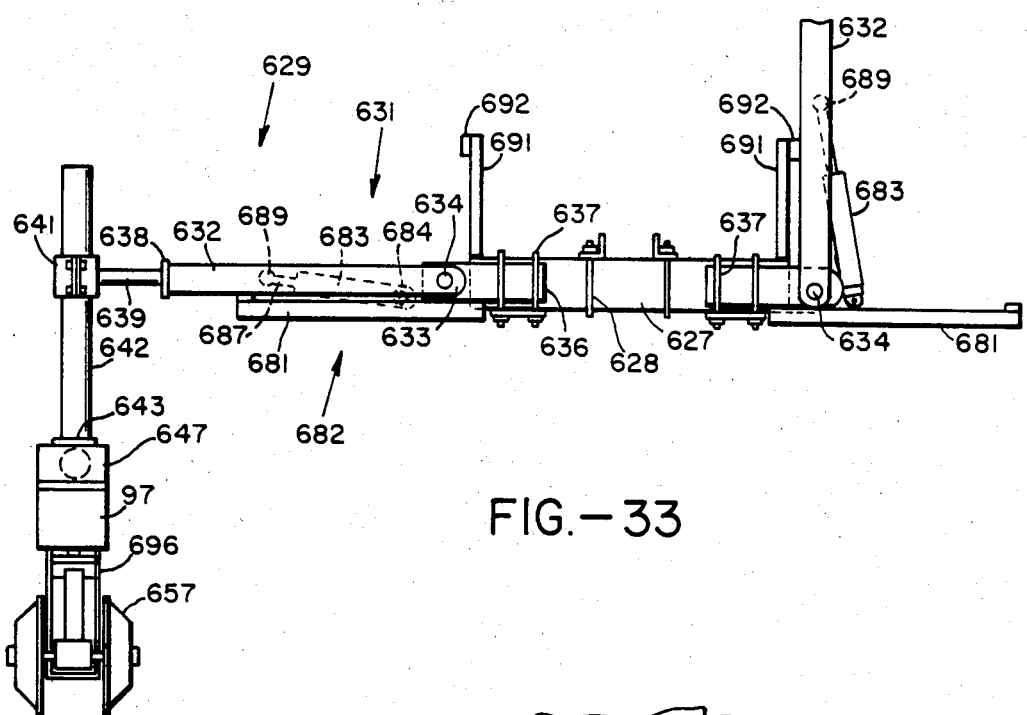
FIG. 33 is a front elevational view of one embodiment of an agricultural apparatus incorporating the present invention.
Figure 34:
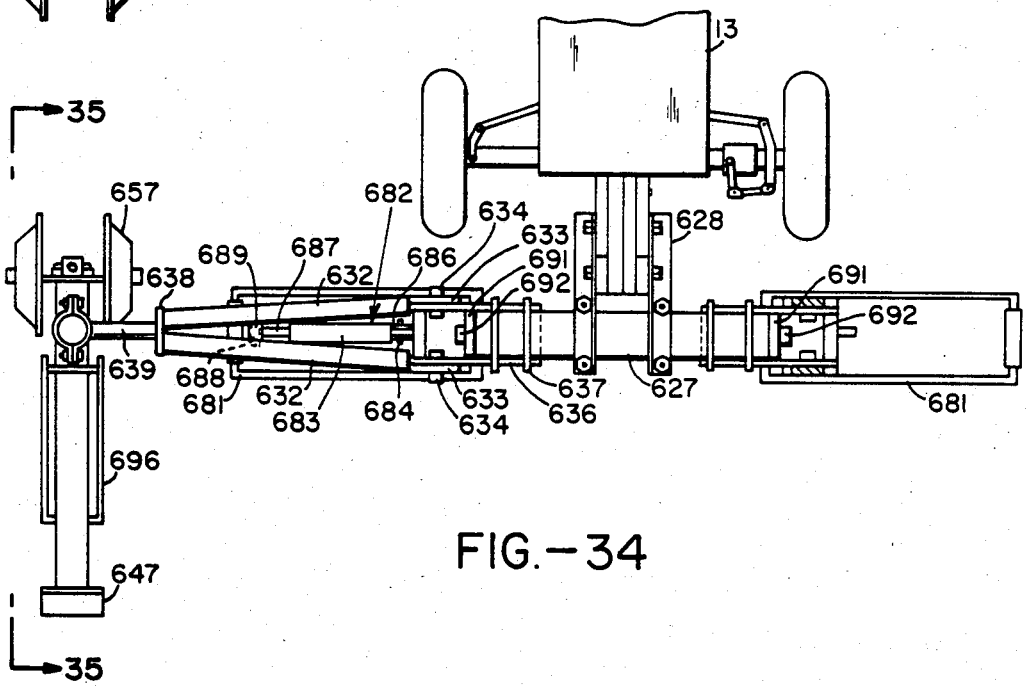
FIG. 34 is a top plan view of the apparatus shown in FIG. 33.

The boat assembly 547 as shown in the drawings and particularly FIGS. 30 and 32 is formed of side plates 566 and 567 and a bottom plate 568 which have been welded together to form a substantially V-shaped structure. The forward extremities of the plates 566 and 567 have been brought together at their lower extremities to form a substantially vertical member 569 as shown in FIG. 30 so as to make it easier for the boat to penetrate the soil in the furrow and to move aside the clods and the like without deflection of the boat. As also can be seen from the drawings, the upper extremities of the side plates 566 and 567 are inclined outwardly and are provided with outwardly and upwardly extending flanges or lip portions 566a and 567a. These lip portions 566a and 567a extend upwardly and outwardly at a suitable angle as, for example, an angle approximately 30°. The lip portions serve to stabilize the boat by pressing dirt clods and the like back down into the sides of the furrow. A U-shaped bracket 571 is secured to the bottom plate 568 by suitable means such as welding. The U-shaped bracket 571 is pivotally connected to the lower extremity of the vertical tubular arm 548 by a bolt 572.

The boat 547 also includes a plurality of rods 573 secured to the rearward extremities of the side plates 566 and 567 and the bottom plate 568 by suitable means such as welding. The rods 573 extend in a direction substantially parallel to each other and are spaced approximately four inches apart and form a substantially V-shaped structure in general conformity with the rear extremity of the portion of the boat structure formed by the plates 566, 567 and 568. Another rod 574 is provided which is secured to the rear extremities of the rods 573 and extends in a direction which is generally at right angles to the same and is secured to the rods 573 by suitable means such as welding so as to reinforce the structure formed by the rods 573 and also to maintain the rods 573 in a parallel relationship.

It has been found that the use of such rods in connection with a boat assembly makes it possible for loose dirt and clods to enter inside the boat as the boat is moved forward and dirt and small clods within the boat serves to increase the weight of the boat and serves to maintain the boat in a lowermost position in the furrow.

Means is provided for increasing the force applied to the boat 547 so as to maintain it in a lowermost position in the furrow during movement of the same in a furrow and consists of a U-clamp 575 576 which is pivotally secured to the upper extremity of the bar 556 by a bolt 576 (FIG. 29). A rod 577 is carried by the clamp 576 and extends through the upper extremity of a support member 578 secured to the secondary framework 534. Springs 579 and 581 are provided on the rod 577 on opposite sides of the member 578. A collar 582 provided with a set screw 583 is mounted on the outer extremity of the rod 577 and is utilized for adjusting the yieldable force which is applied by the springs 579 and 581 to retain the boat 547 in the furrow while at the same time maintaining the arm 548 in a generally vertical position.

Means is provided for limiting the movement of the generally vertical arm 548 from a vertical position and 586 consists of a stop assembly 586. The stop assembly consists of vertically extending plates 587 which are secured to the secondary framework 534 by suitable means such as welding. Bushings 588 are secured to the plates 587. Bolts 589 are mounted in the bushings 588. The bolts 589 are held in the desired position with the head facing towards the outer extremity of the secondary framework 534 by the use of nuts 591 threaded onto the bolts 589 on opposite sides of the bushings 588. It can be seen that by adjustment of the nuts 591 on the bolts 589, the heads of the bolts 588 can be positioned so as to limit the amount of travel of the tubular member 548 and the bar 556 from their normal generally vertical positions. As, for example, if the stops provided by the heads of the bolts 588 are set so as to provide one-eighth inch clearance, this will permit approximately only one inch of lateral movement of the boat 547 and thus will serve to straighten out sharp kinks in a furrow. With such an adjustment, it has been found that the variation in steering of the tractor can be limited to approximately 1°.

Means is provided for raising the boom structure 527 from a furrow engaging position to an out-of-the-way position and consists of a hydraulic actuator 596. The cylinder 597 of the hydraulic actuator 596 is pivotally connected to the bar 528 by a pin 599. The piston rod 600 of the hydraulic actuator 596 is pivotally connected by a pin 601 to a floating link 602. The floating link 602 is pivotally connected to a bracket 603 by a pin 604. The bracket 603 is secured to the primary framework 533. The floating link 602 is also provided with bolts 606 on opposite sides thereof which serve as stops. The use of the floating link 602 makes it possible for the tractor to move up and down while permitting the arm to remain in a downward position, that is, with the boat 547 in engagement with the furrow rather than lifting it out of the furrow in the event the front of the tractor is raised. The floating link also prevents the hydraulic actuator from locking up and lifting the boom structure 527 in the event that the front of the tractor is suddenly raised.

Means is provided for limiting the uppermost travel position of the boom structure 527 and consists of an A-frame 608 of the cross member bar 528 and extending upstanding vertically therefrom adjacent one of the front wheels 14 of the tractor and adjacent an end of the cross member or bar 528 mounted on the tractor. The A-frame 608 carries a rubber bumper 609. The primary framework 533 carries a corresponding rubber bumper 611 which is adapted to engage the bumper 609 when the boom structure 527 is raised.

The automatic steering mechanism of this embodiment in addition to including the tracking control unit 97 as a part of the electronics also includes the other portions of the electronics hereinbefore described with the previous embodiments. The operation of the electronics in connection with the automatic steering mechanism from the previous explanations is readily apparent.

The automatic steering mechanism incorporating the present invention is shown in FIGS. 33–36. The automatic steering mechanism 626 shown in these figures can be characterized as being of a type which has a trailing guiding system for reasons hereinafter apparent. The automatic steering mechanism 626 as shown in the drawings consists of a bar or cross member 627 which is secured to the front end of the tractor 13 by suitable means such as U-clamps or U-bolts 628. A boom structure 629 is mounted on each of the ends of the bar or cross member 627. The boom structure 629 consists of a framework 631. The framework 631 consists of elongate tubes 632 which are rectangular in cross section. The tubes 632 are provided with ears 633 which are pivotally connected by bolts 634 to side plates 636. The side plates 636 are secured to the bar or cross member 627 by U-bolts 637.

As can be seen in the drawings, the distal ends of the tubes 632 are inclined inwardly and are joined together by a plate 638 secured to the outer extremities of the same by suitable means such as welding. A tube 639 extends outwardly from the plate 638 in a direction which is generally parallel to the tubes 632. A cylindrical clamping structure 641 is secured to the outer extremity of the tube 639 and is adapted to frictionally engage a generally vertical arm 642. The clamping structure 641 is adapted to be loosened so that the arm 642 can be raised or lowered in the same and then tightened to hold the arm 642 in the desired position. A plate 643 is secured to the lower extremity of the arm 642 and is secured by U-bolts 644 to an arm 646. A bracket 647 is secured to the forward extremity of the arm 646. The bracket 647 carries the tracking control unit 97 of the type hereinbefore described. An arm 648 is provided for operating the shaft 197 of the tracking control unit 97. This arm 648 is pivotally connected by a pin 649 to a hollow tube 651 which is rectangular in cross section. A smaller tube 652 rectangular in cross section is slidably mounted within the tube 651 and is adapted to be held in the desired position in the tube 651 by a set screw 653. The outermost extremity of the tube 652 is secured to a bushing 654. A rod 656 extends through the bushing 654 and carries a pair of spaced apart rotatably mounted cone wheels and retained thereon by collars 658 and set screws 659 extending through the collars.

Yieldable means as provided for urging the cone wheel 657 into engagement with the furrow in which they are to travel. This includes a vertically extending guide rod 661 which is secured at its upper end by a clamp 669, which in turn is connected to a vertically extending plate 676 attached to the rear most extremity of the arm 646. A lower collar 662 is secured to the bushing 654 while a collar 664 is secured to the guide rod 661 by set screw 666. A spring 663 is under compression between the two collars 662 and 664 to provide downward urging on the wheel 657. However, the engagement between the lower end of the spring 663 and the cup-shaped collar 662 is such that the wheel 657 can move laterally a limited amount. The guide rod 661 terminates slightly below the collar 664 such that the cone wheels can move upwardly a limited amount against the urging of the spring to accommodate dirt clods, etc. With this arrangement, the cone wheels are free to move within the guide furrow.

A U-shaped member 672 is secured to the shaft or rod 656 and extends rearwardly and upwardly from the cone wheels 657 as shown particularly in FIG. 35.

A U-shaped framework 681 is secured to each of the outer extremities and lower portions of the cross member 627 by suitable means such as welding and extends outwardly from the opposite ends of the same in a generally horizontal direction and serves as a support for the boom structure 629 to prevent it from going into position which is below the horizontal position. Means is provided for moving the boom structure 626 from a position in which the cone wheels 657 engage the furrow into an out-of-the-way or generally vertical position and consists of a hydraulic actuator 682. The cylinder 683 of the hydraulic actuator is connected by a bolt 684 to an ear 686 secured to the outer extremity of the bar 627. The piston rod 687 of the hydraulic actuator 682 is connected by a pin 688 to an ear 689 carried by the framework 631.

As in certain of the hereinbefore described embodiments, means is provided for limiting the movement of the boom structure 629 to an out-of-the-way position and consists of an A-frame 691 which is secured to the outer extremity of the bar or cross member 627 and which is provided with a rubber stopper 692.

Means is provided for restraining the movement of the cone shaped guide wheels and the mechanism connected thereto when the boom structure 629 is raised and consists of a rectangular framework 696 which is clamped to the arm 646 by a U-bolt 697. It can be seen that the rectangular framework 696 is supported in such a position so that it extends downwardly and rearwardly from the point on which is it connected to the arm 646 and intermediate the linkage consisting of the bars 651 and 652 connected to the tracking control unit 97. Thus it can be seen that when the boom structure 26 is raised, the rectangular framework 696 will only permit limited downward movement of the cone-shaped guide wheels 657 and will also permit only limited lateral movement of the cone-shaped guide wheels 657 because of the engagement of the bar 651 with the rectangular framework 696.

With the foregoing construction it can be seen that stops have been provided to limit the movement of the tracking arm which controls the tracking control unit 97. Thus as in previous embodiments, the movement of the cone-shaped guide wheels is limited to approximately 1° which with an arm 30 inches in length would permit movement from side to side of approximately one inch. By lengthening or shortening the arm, the sensitivity can be adjusted. In other words by shortening the arm, the sensitivity can be increased or by lengthening it, the sensitivity can be decreased.

When the vehicle is on its predetermined path, the wheels 657 and the arm 651 are in a vertical plane in the direction of the predtermined path. Thus, they are at a predetermined angle. If the frame shifts laterally, the forward end of the arm likewise shifts laterally, thus changing the arm and the wheel from the predetermined angle or direction to a slightly off track position. After the tracking unit has sensed this change and the necessary correction made, the frame will move laterally returning the forward end of the arm to its original predetermined angle or direction of movement.

Figure 39:
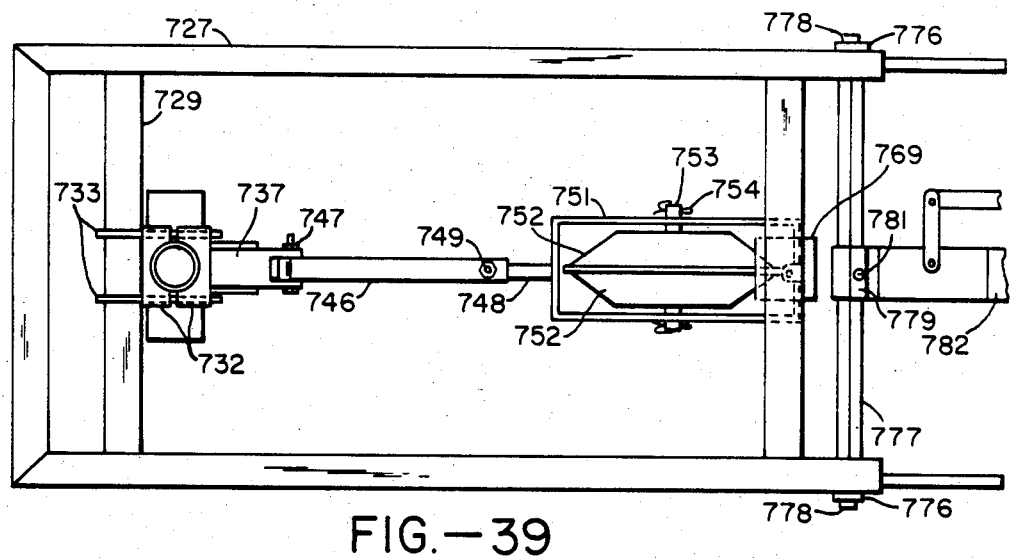
FIG. 39 is a view looking along the line 39—39 of FIG. 38.

Another version of the automatic steering apparatus incorporating the present invention is shown in FIGS. 37, 38 and 39. The automatic steering apparatus 726 is shown therein and consists of a U-shaped framework 727 which is secured to the sides of the tractor 13 by cap screws 728. The framework 727 extends in a substantially horizontal plane in front of the tractor 13. A cross member 729 is provided within the U-shaped framework 727 adjacent the front extremity thereof and extends transversely of the framework 727 in a direction at right angles to the direction of the path of travel of the tractor 13. A vertical arm 731 is secured to the cross member 729 such as by the use of mounting blocks 732 supported by U-bolts 733. A bracket 736 is mounted on the lower extremity of the arm 731. Control box 97 is carried by the bracket 736. The tracking box 97 is provided with the shaft 197 which is connected to a block 737.

A tracking bar assembly 746 is pivotally secured to the block 737 by a bolt 747. The tube assembly 746 consists of a member 748 of rectangular cross section and a smaller tube 749 also of a rectangular cross section slidably mounted in the member 748 and which is secured in a predetermined position within the same by a bolt 750. A small rectangular framework 751 is secured to the outermost extremity of the smaller tube 749. A pair of closely spaced cone wheels 752 are rotatably mounted upon a rod 753 which is mounted in the framework 751 and is secured therein by cotter keys 754.

Yieldable means is provided for urging the cone wheels 752 into engagement with the ground and consists of a spring 756 which is secured to the bolt 750 and which has its other end connected to a threaded rod 757. The threaded rod 757 is threaded into nuts 758 disposed on opposite sides of a support eye 759. The eye 759 is mounted on a bracket 761 secured to the block 737. It can be seen that by adjusting the position of the nuts 758 on the rod 757 that the amount of tension supplied by the spring 756 can be adjusted to thereby adjust the force yieldably urging the cone wheels 752 into engagement with the ground.

Means is provided for sensing when the bar 746 moves beyond a predetermined amount and consists of a limit switch 763 which has a roller follower 764 adapted to engage the tube 748. The limit switch 763 is carried by the bracket 761 and is connected to an electrical cable 766 which is connected into the electrical circuitry to the system to turn the pilot on automatic when the arm is lowered.

Means is provided for raising the cone wheels out of engagement with the ground and consists of a strap 767 which is secured to the rectangular framework 751. An elongate flexible member 768 is secured to the strip 767. The elongate flexible member 768 is adapted to be payed in and payed out by a small hydraulic hoist 769 carried by a support 771 mounted in the framework 727.

A pair of straps 776 are secured to the rear extremities of the U-shaped framework 727 and depend therefrom. A bar 777 which is rectangular in cross section is secured to the lower extremities of the straps 776 by cap screws 778. A sleeve 779 is mounted on the bar 777 and is held in a predetermined position by a cap screw 781. A bracket 782 is carried by the sleeve 779 and has mounted thereon the repeat back control unit 98. The unit 98 has an output shaft 177 which is connected by a linkage 780 to the front steering linkages of the tractor 13 in a manner such that movement applied to the shaft 177 corresponds to the corrective steering action. With the center guide automatic steering apparatus 726 shown in FIGS. 37, 38 and 39, the electronics for use therein is simplified in that approximately one half of the switches can be eliminated. The sensitivity and steering ratio controls are retained. The cams which have been utilized can be eliminated as well as one set of the amber green and amber lights and one control unit 97. For purposes of convenience, the amber green and amber lights can be characterized as "wide" "on", and "narrow" rather than "amber" "green" and "amber" respectively. The first or left hand "amber" light is equivalent to the "wide" indicator which indicates that the furrow which is being formed is too wide, whereas the second or right hand amber light is equivalent to the "narrow" indicator and indicates that the furrow being formed is too narrow.

The mark which the cone wheels 752 are to follow in connection with the use of this apparatus can be made in a conventional manner such as by use of a marker assembly carried by the lister which is being utilized with the automatic steering mechanism. Such markers are conventionally provided on such equipment and are used by the operator for visually steering the tractor. The same marker can be utilized and engaged by the cone wheels 752 for automatically steering the tractor in the manner hereinbefore described in connection with the other automatic steering mechanism herein disclosed.

It should be appreciated that in place of the cone shaped guide wheels 752, other means can be utilized for operating the control box 97. Thus for example when the automatic steering apparatus is being utilized for harvesting or cultivating crops, the cone wheels can be replaced by fingers (not shown) formed into a vee which are adapted to engage the stalks of the plants and thereby guide the tractor. If it is desired to utilize the same in connection with a furrow, the cone wheels can be spread apart and used in the furrow or alternatively two side plates can be secured to the trailing arm to operate the control box 97.

Figure 40:
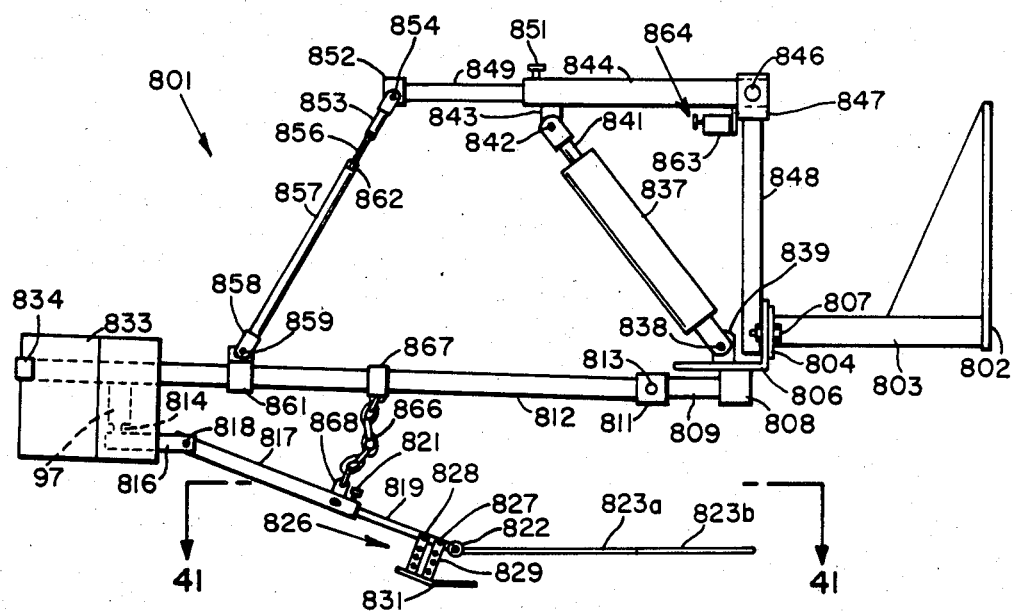
FIG. 40 is a side elevational view of still another embodiment of an agricultural apparatus incorporating the present invention.

Still another embodiment of the automatic steering apparatus incorporating the present invention is shown in FIGS. 40 through 42. As shown therein, the automatic steering mechanism 801 consists of a pair of angle brackets 802 which are secured to the framework of the tractor by suitable means such as bolts (not shown). Members 803 are secured to the brackets 802 by suitable means such as welding and extend forwardly in a generally horizontal plane. The members 803 are generally spaced apart and parallel and are formed of a suitable material such as tubing of rectangular cross-section. The forward extremities of the members 803 are secured by suitable means such as welding to a plate 804. An angle member 806 is secured to the plate 804 by suitable means such as bolts 807. A block 808 is secured to the lower side of the angle member 806 and has mounted thereon a tubular member 809 which extends forwardly in a general horizontal plane. A U-shaped member 811 is welded to the member 809. An arm 812 is provided which has one end pivotally mounted in the U-shaped 811 by a bolt 813.

A control unit 97 of the type hereinbefore described is secured to the outer extremity of the arm 812 and depends downwardly therefrom. Its output shaft 814 is connected to a block 816. An arm 817 has one end pivotally mounted in the block 816 by a pin 818. Another arm 819 is slidably mounted in the arm 817 and is held in an adjusted position by a set screw 821. A cross member 822 is carried by the rearward extremity of the arm 819. A pair of tines or guiding fingers 823 are carried by the cross member 822. The tines 823 are secured to the cross member 822 by suitable means such as welding. As can be seen, the tines are each provided with an outwardly inclined portion 823a and a rearwardly inclined portion 823b. The tines or guiding fingers 823 are formed of a suitable spring-like material and have a dimensional cross-section so that they are relatively flexible and can be used for sensing crop in rows as hereinafter explained.

A sled 826 is provided and serves to carry the tines 823 at a level which is slightly above ground level. This sled consists of a plate 827 which is secured to the arm 819 by suitable means such as cap screws 828. The plate 828 is provided with additional holes 829 so that the plate 827 can be adjusted in various vertical positions with respect to the arm 819. A shoe 831 is secured to the lower extremity of the plate 827 by a suitable means such as welding and is adapted to engage the surface of the ground over which the automatic steering mechanism 801 travels. A generally V-shaped shield 833 is mounted on the forward extremity of the arm 812 and is mounted in such a manner so that it serves to protect the control unit 97. The arm 812 extends through a hole 834 provided in the shield. The shield 833 mounted in such a manner so that its apex faces in a forward direction with the sides of the shield extending rearwardly past the control unit 97 so as to protect the control unit from crops and other objects which may be encountered in traveling through the field.

Means is provided for raising and lowering the arm 812 from a lowered or plant engaging position to an out-of-the-way position and consists of a hydraulicactuator 836. The cylinder 837 of the hydraulic actuator 836 is pivotally connected by a pin 838 to an upstanding ear 839 provided on the angle member 806. The piston rod 841 of the hydraulic actuator 836 is pivotally connected by a pin 842 to an ear 843. The ear 843 is carried by the lower extremity of an arm 844. The arm 844 has one end pivotally connected by a pin 846 to a U-shaped member 847. The U-shaped member 847 is welded to the upper extremity of a vertically extending post 848 which is mounted on the angle member 806 by suitable means such as welding. Another arm 849 is slidably mounted in the arm 844 and is held in the desired adjusted position by a set screw 851. A fitting 852 is carried by the outer extremity of the arm 849. A U-shaped clevis 853 is pivotally connected to the fitting 852 by a pin 854. A threaded rod 856 is connected to the clevis 853. The threaded rod is threaded into a tube 857. A U-shaped member 858 is secured to the other end of the tube 857 and is pivotally connected by a pin 859 to a bracket 861 mounted on the arm 812. A nut 862 is provided for locking the threaded rod 856 in a predetermined position with respect to the tube 857.

A limit switch 863 is secured to the block 847 and is provided with a follower 864 which is adapted to engage the lower portion of the arm 844 and is provided for sensing when the automatic steering mechanism 801 is in a plant engaging position or when it is in a raised or out-of-the-way position as shown in FIG. 42. Means is provided for limiting the downward travel of the arm 817 when the automatic steering mechanism is moved to a raised position as shown in FIG. 42 and consists of a chain 866 that has one end secured to a bracket 867 which is mounted on the arm 812 and has its other end secured to an ear 868 provided on the arm 817.

Operation of this embodiment of the invention shown in FIGS. 40 to 42 is very similar to that hereinbefore described with principal difference being in the mechanical structure utilized for carrying the guiding elements. In this case, the guiding elements are in the form of spring-like tines or feeler-like fingers 823 which are adapted to sense the crop which has been planted in rows. Thus, for example, the automatic steering mechanism can be utilized for caring for and harvesting row crops. For example, the guiding apparatus can be utilized for guiding cultivating apparatus after the plants have grown to a size in which they can be utilized to guide the fingers 823. Similarly, during harvesting operations, the tines or fingers can be utilized for sensing the crop as, for example, cotton planted in rows, corn and the like. From the foregoing embodiments of the automatic steering mechanism of the present invention it can be seen that the automatic steering mechanism can take many forms and is very versatile in that it can be utilized for planting crops by utilizing furrows or marks formed in the soil for guiding the automatic steering mechanism. Similarly, embodiments have been disclosed which can be utilized for sensing row crops to permit the tending and harvesting of row crops. All of these operations can be carried out with great precision utilizing the various embodiments of the automatic steering mechanism.

Figure 43:
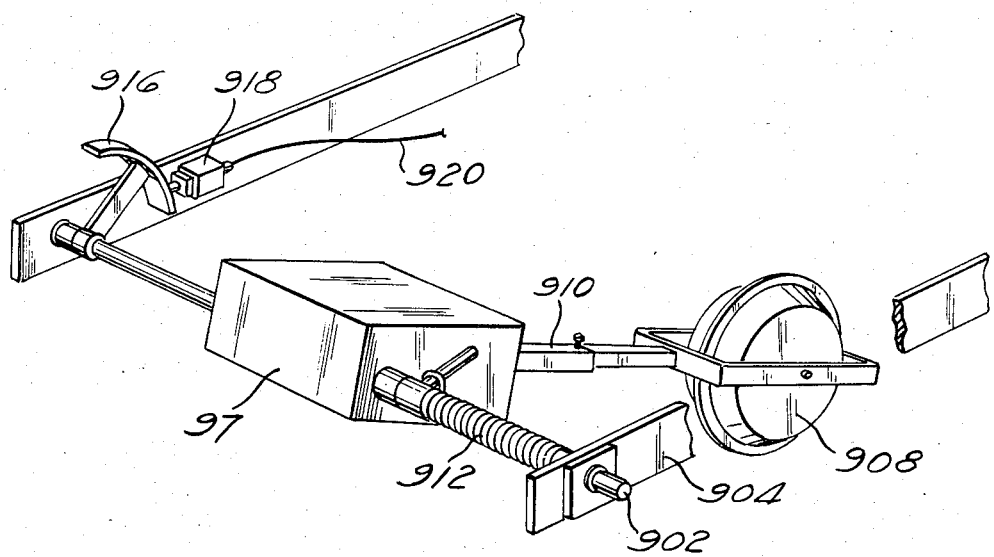
FIG. 43 is a perspective view of a simplified version of a system similar to that shown in FIGS. 37-39.

FIG. 43 illustrates a simplified form of the invention being somewhat of a modification of the system disclosed in FIGS. 37–39. In that arrangement, a forward shaft 902 is rotatably mounted in the forward end of a framework 904 mounted in the front of a tractor. The tracking unit 97 is mounted in a housing which is directly mounted on this shaft 902. Ground engaging cone wheels 908 are connected to an arm 910, with the arm extending into the tracking unit 97. A torsion spring 912 is mounted on the shaft 902 to provide a force on the tracking unit housing in a clockwise direction, as viewed in FIG. 43. The connection between the upper end of the arm in the tracking unit is such that the torque imparted to the tracking unit is also transmitted to the connecting arm 910. Likewise, if the tracking wheel 908 should encounter a clod of dirt and move upwardly, the arm, as well as the tracking unit, will pivot with the shaft 902 against the urging of the torsion spring 912. Further, the connection between the upper end of the arm 910 and the tracking unit is such that lateral movement of the wheel 908 will result in rotation of the shaft 197 (not shown) in FIG. 43 in the tracking unit, in a manner analoguous to the embodiment illustrated in FIGS. 38 and 39.

The means for sensing movement of the arm 910 is also simplified. A cam 916 mounted on the shaft 902 engages a limit switch 918 mounted on the frame in a manner to indicate when the arm 910 and the wheel 908 moves beyond a predetermined amount. An electrical cable 920 is shown connected to the switch 918.

It is apparent from the foregoing that there has been provided an agricultural apparatus with an automatic positioning mechanism which has numerous applications. As hereinbefore described, this automatic positioning mechanism can take the form of an automatic steering mechanism for steering a tractor. This steering can be accomplished by sensing pre-existing furrows or ridges or alternatively can follow a predetermined path in a field. The automatic positioning mechanism also can take the form of a positioning mechanism attached to agricultural equipment drawn or carried by a tractor to maintain the position of the agricultural equipment which is particularly advantageous when farming hillsides where there is a tendency for the agricultural equipment to slip laterally. The electrical circuitry associated with such an automatic positioning mechanism is of a type which can be utilized universally with steering and/or positioning mechanisms of the type hereinbefore described. Such electrical circuitry is of a type which can be utilized in farming applications and which can be maintained relatively inexpensively. It is also of a type which can be readily mounted and demounted from a tractor or other agricultural equipment utilized in farming operations.

I claim:

1. In an agricultural apparatus having an automatic positioning mechanism, a framework supported in a position above the ground for movement over the ground, an arm connected to the framework at a predetermined angle, a ground-engaging member carried by the arm for following a predetermined path as the apparatus is moved over the ground, said arm being mounted to permit limited movement of the arm angularly relative to said framework in a direction lateral to said path to change said angle, actuator means for causing movement of the framework responsive to said limited movement, electrical circuit means responsive to the movement of said arm from said predetermined angle and connected to said actuator means for causing operation of the actuator means to automatically position the framework so that the framework travels along a path which is parallel to said predetermined path, the ground-engaging member being mounted to trail the mounting for the arm so as to minimize the load produced by said ground-engaging member; said apparatus including a self-propelled vehicle, and the framework being mounted on the vehicle extending forwardly from the front of the vehicle, the mounting for said arm being near the forward portion of the framework with the ground-engaging member extending rearwardly towards the forward end of the vehicle; the electrical circuit means including a tracking unit which is responsive to the angular movement of said arm, and including means for transmitting electrical signals to cause the actuator to move the framework in a manner to return the arm to its predetermined angle.

2. The apparatus of claim 1 wherein the ground-engaging member includes two wheels having a frusto-conical shape and mounted on a common axle to form a shape to mate with walls of a furrow.

3. The apparatus of claim 1 further including a pair of flexible elongated fingers which are held off the ground by said ground-engaging member, the fingers being adapted to engage a row of plants on each side so as to maintain the ground-engaging member on a predetermined path between the two rows.

4. The apparatus of claim 1 wherein said ground-engaging member includes a pair of elongated, outwardly extending, flexible tines forming a generally V-shape with the tines engaging a row of plants on each side.

5. The apparatus of claim 1, including spring means urging the ground-engaging means downwardly towards the ground.

6. The apparatus of claim 1 wherein the tracking unit is mounted on the forward end of said framework, and the unit includes an input shaft linked directly to said arm in a manner such that the ground-engaging member is towed by the tracking unit and angular movement of the arm rotates said shaft.

7. The apparatus of claim 6 wherein said electrical circuit means includes a repeat back unit mounted on said framework adjacent the front of the vehicle and including linkage connecting the repeat back unit to the vehicle steering linkage to the wheels in a manner such that corrective steering movement of the vehicle is transmitted to the repeat back unit, and the repeat back unit in turn provides signals to the tracking unit that further corrective action is not needed.

8. The apparatus of claim 1 including a rotatable shaft at the forward end of the framework, said tracking unit being fixed to the shaft to rotate with the shaft, and said arm being connected to the tracking unit in a manner such that the arm will move vertically with the tracking unit and rotation of the shaft, and the arm is further connected to the tracking unit in a manner such that angular lateral movement of the arm is sensed by the tracking unit with the information being used in the electrical circuitry for causing operation of the actuator means.

9. The apparatus of claim 8 including a torsion spring mounted on one end of the shaft in a manner to urge the tracking unit and the arm and the ground engaging member in a direction to urge the ground engaging member against the ground.

10. The apparatus of claim 9 including a limit switch on said frame, and a cam on said shaft for actuating said limit switch when the ground engaging member has moved vertically a predetermined amount.

11. In an agricultural apparatus having an automatic positioning mechanism, a framework supported in a position above the ground for movement over the ground, an arm connected to the framework at a predetermined angle, a ground-engaging member carried by the arm for following a predetermined path as the apparatus is moved over the ground, said arm being mounted to permit limited movement of the arm angularly relative to said framework in a direction lateral to said path to change said angle, actuator means for causing movement of the framework responsive to said limited movement, electrical circuit means responsive to the movement of said arm from said predetermined angle and connected to said actuator means for causing operation of the actuator means to automatically position the framework so that the framework travels along a path which is parallel to said predetermined path, the ground-engaging member being mounted to trail the mounting for the arm so as to minimize the load produced by said ground-engaging member; said framework including a laterally extending boom with a support secured to the outer end of the boom and extending forwardly from the boom, and wherein the forward end of said arm is connected to the forward end of said support so that the ground-engaging member is trailing the forward end of the support.

12. The apparatus of claim 11 wherein said electrical circuit includes a tracking unit mounted on the forward end of said support with said arm being connected to a control linkage connected to the tracking unit so that the ground-engaging member is actually towed by the tracking unit through the control linkage.

13. The apparatus of claim 12 including means extending from the frame to the arm for lifting the ground-engaging member and the arm so that the member no longer engages the ground.

14. The apparatus of claim 12 wherein said member comprises row crop sensing means for following a predetermined path between two rows of crops.

15. The apparatus of claim 14 wherein said sensing means is a pair of spring-like outwardly extending fingers.

16. The apparatus of claim 12 including a self-propelled vehicle and said member is mounted on the framework generally centered with respect to the vehicle.

17. In an agricultural apparatus with an automatic steering mechanism, a self-propelled vehicle having a framework, means for supporting the framework in a position above the ground for movement over the ground, said framework having first and second portions in which one portion can be shifted in position with respect to the other portion, an arm, means mounting said arm on said second portion of the framework permitting relative movement between the arm and the second portion, a member carried by the arm for following a predetermined path, actuator means coupled between the first and second portions of the framework for causing movement of one portion of the framework with respect to the other portion of the framework, electrical circuit means carried by said framework responsive to the movement of said arm and connected to said actuator means for causing operation of the actuator means to automatically position one portion of said framework with respect to the other portion of said framework so that the second portion of the framework travels along a path in accordance with said predetermined path, said electrical circuit means including a tracking unit secured to one portion of the framework and having a shaft rotatably mounted therein, a control linkage connecting said arm to said shaft whereby as said arm is moved said shaft will be rotated, an adjustable potentiometer carried by the tracking unit, means for adjusting said potentiometer responsive to rotation of said shaft in said tracking unit, a repeat back unit carried by the other portion of said framework, a rotatable shaft carried by said repeat back unit, means connecting said rotatable shaft of said repeat back unit to said first portion of said framework whereby relative movement between said first and second portions of said framework causes rotation of the shaft in the repeat back unit, an adjustable potentiometer carried by the repeat back unit, means for adjusting the potentiometer in the repeat back unit in response to rotation of the shaft in the repeat back unit, means for supplying a voltage to the potentiometers of the tracking unit and the repeat back unit and for receiving signals from the potentiometers of the tracking units and the repeat back units and means responsive to said signals for causing operation of the actuator means to cause it to move in accordance with the signal received from the tracking unit, said member being mounted in a manner such that it trails said arm.

18. Apparatus as in claim 11 wherein said electrical circuit means includes trimming potentiometers connected to each end of the potentiometer in the tracking unit for compensating for steering errors.

19. Apparatus as in claim 17 wherein said electrical circuit means includes trimming potentiometers, connected to each end of the potentiometer in the repeat back unit for changing the electrical ratio between the repeat back unit and the tracking unit.

* * * * *